US012784504B2

(12) United States Patent
Ackerman et al.

(10) Patent No.: US 12,784,504 B2
(45) Date of Patent: Nov. 3, 2026

(54) MOWER POSITIONING CONFIGURATION SYSTEM

(71) Applicant: Deere & Company, Moline, IL (US)

(72) Inventors: Chad A Ackerman, Urbana, IL (US); Nathan Ogden, Mahomet, IL (US); Mark D. Moran, Urbana, IL (US); Scott A Stephens, Scottsdale, AZ (US)

(73) Assignee: Deere & Company, Moline, IL (US)

( * ) Notice: Subject to any disclaimer, the term of this patent is extended or adjusted under 35 U.S.C. 154(b) by 315 days.

(21) Appl. No.: 16/892,662

(22) Filed: Jun. 4, 2020

(65) Prior Publication Data

US 2021/0378172 A1 Dec. 9, 2021

(51) Int. Cl.

| | |
|---|---|
| ***G06V 40/20*** | (2022.01) |
| ***A01D 34/00*** | (2006.01) |
| ***G05D 1/00*** | (2024.01) |
| ***G06V 20/20*** | (2022.01) |

(52) U.S. Cl.

CPC ........... *G06V 40/28* (2022.01); *A01D 34/008* (2013.01); *G05D 1/0038* (2013.01); *G05D 1/0219* (2013.01); *G05D 1/0234* (2013.01); *G05D 1/0278* (2013.01); *G06V 20/20* (2022.01)

(58) Field of Classification Search

CPC .. A01D 34/008; G05D 1/0038; G05D 1/0219; G05D 1/0234; G05D 1/0278; G05D 2201/0208; G05D 1/028; G06V 20/13; G06V 20/20; G06V 40/28

See application file for complete search history.

(56) References Cited

U.S. PATENT DOCUMENTS

| | | | | | |
|---|---|---|---|---|---|
| 8,502,670 | B2 * | 8/2013 | Cha | G01S 13/82 | 340/572.1 |
| 10,168,857 | B2 * | 1/2019 | Alnatsheh | G06Q 30/0241 | |
| 11,069,082 | B1 * | 7/2021 | Ebrahimi Afrouzi | H04N 23/56 | |
| 2002/0049522 | A1 * | 4/2002 | Ruffner | B60L 8/003 | 318/587 |
| 2010/0066587 | A1 * | 3/2010 | Yamauchi | G05D 1/0274 | 342/54 |
| 2010/0295943 | A1 * | 11/2010 | Cha | G01S 13/82 | 340/539.13 |
| 2015/0271991 | A1 * | 10/2015 | Balutis | G05D 1/0011 | 700/264 |
| 2016/0071325 | A1 * | 3/2016 | Callaghan | G06T 19/006 | 345/633 |
| 2016/0100522 | A1 * | 4/2016 | Yamauchi | G05D 1/0219 | 701/25 |

(Continued)

OTHER PUBLICATIONS

German Search Report issued in application No. DE102021204256.2 dated Nov. 20, 2023 (06 pages).

*Primary Examiner* — Sihar A Karwan
(74) *Attorney, Agent, or Firm* — Christopher J. Volkmann; KELLY, HOLT & CHRISTENSON PLLC

(57) ABSTRACT

A user defines a boundary of a mowed area on an image of the mowed area, on a mobile device. An optimization algorithm operates on the bounded mowing area to identify a beacon configuration that identifies a location for each of a plurality of different beacons to be placed about the mowing area. The user can then be guided to the different beacon locations, in order to place a beacon at each of the different beacon locations, using an augmented reality system that provides user assistance on a camera view of the user's mobile device.

16 Claims, 21 Drawing Sheets

(56) References Cited

U.S. PATENT DOCUMENTS

| | | | | |
|---|---|---|---|---|
| 2016/0148433 | A1* | 5/2016 | Petrovskaya | G02B 27/01<br>345/633 |
| 2016/0165795 | A1* | 6/2016 | Balutis | G05D 1/0044<br>701/25 |
| 2016/0193729 | A1* | 7/2016 | Williams | G01C 21/3856<br>901/1 |
| 2018/0038694 | A1* | 2/2018 | Bruemmer | G01C 21/005 |
| 2018/0306587 | A1* | 10/2018 | Holz | B66F 9/0755 |
| 2018/0307941 | A1* | 10/2018 | Holz | G06V 30/1988 |
| 2019/0132815 | A1* | 5/2019 | Zampini | G06Q 50/06 |
| 2019/0168394 | A1* | 6/2019 | Bidram | B60P 1/48 |
| 2019/0208979 | A1* | 7/2019 | Bassa | G05D 1/0274 |
| 2019/0212747 | A1* | 7/2019 | Berkemeier | G05D 1/0251 |
| 2019/0265720 | A1* | 8/2019 | Gupta | G05D 1/0248 |
| 2020/0037498 | A1* | 2/2020 | Ko | G06Q 30/02 |
| 2020/0041601 | A1* | 2/2020 | Ko | G05D 1/02 |
| 2020/0103915 | A1* | 4/2020 | Holz | G05D 1/0088 |
| 2020/0356102 | A1* | 11/2020 | Morse | G01C 21/20 |
| 2021/0157334 | A1* | 5/2021 | Zhou | G05D 1/0278 |
| 2021/0191414 | A1* | 6/2021 | Tolstov | B64U 80/86 |

* cited by examiner

MOWER POSITIONING CONFIGURATION SYSTEM

FIELD OF THE DESCRIPTION

The present description relates to lawn mowers. More specifically, the present description relates to positioning system configuration and control of robotic lawn mowers.

BACKGROUND

The yard maintenance industry is currently dominated by human-driven technology, such as human-driven lawn mowers. These mowers come in a variety of sizes and capabilities, ranging from push-mowers to self-propelled push mowers, and driving mowers for larger green spaces.

Recently, it has been recognized that the regularly-performed action of mowing lawns results in lost time for the operator. Therefore, automation is being applied to the industry. This has led to the development of robotic, or autonomous, mowers. With these types of mowers, an operator often needs to set boundaries for the mower's operation, so that the mower does not move outside of the bounded area.

Some current systems use ultra-wide band (UWB) beacon systems. An operator strategically places beacons throughout the yard to be mowed. The beacons identify and incorporate one another into a localization system of interconnected beacons. This system provides a network of support and location tracking to the robotic mower. They define, for the mower, the target area to be mowed, as well as the boundaries of the mower's operation.

The discussion above is merely provided for general background information and is not intended to be used as an aid in determining the scope of the claimed subject matter.

SUMMARY

A user defines a boundary of a mowed area on an image of the mowed area, on a mobile device. An optimization algorithm operates on the bounded mowing area to identify a beacon configuration that identifies a location for each of a plurality of different beacons to be placed about the mowing area. The user can then be guided to the different beacon locations, in order to place a beacon at each of the different beacon locations, using an augmented reality system that provides user assistance on a camera view of the user's mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

1, in identifying a beacon configuration and assisting a user in deploying beacons according to the identified configuration. 11

Figure 5:
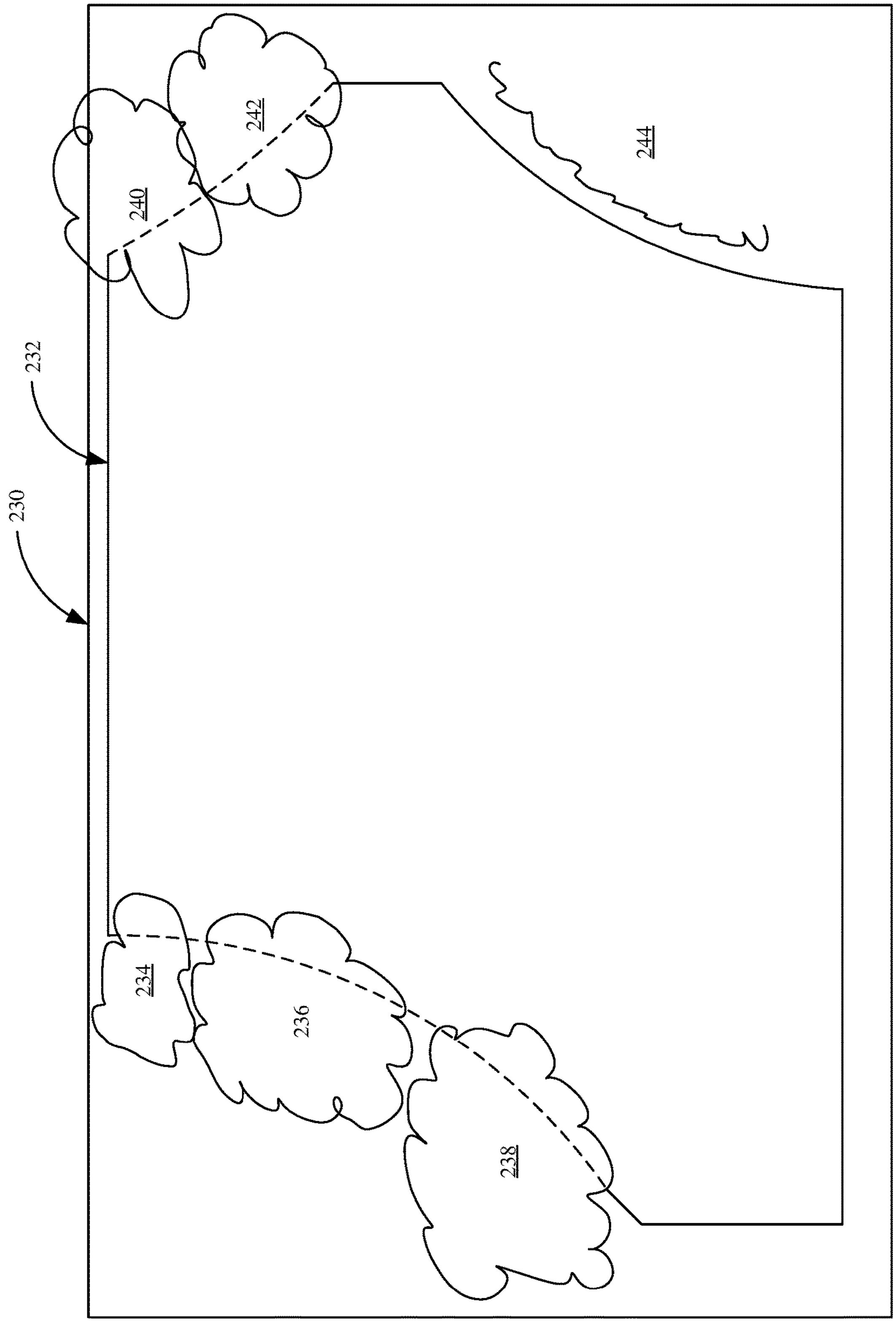

FIG. 5 shows one example of a worksite (e.g., a yard) where a mowing area is to be defined.

Figure 6:
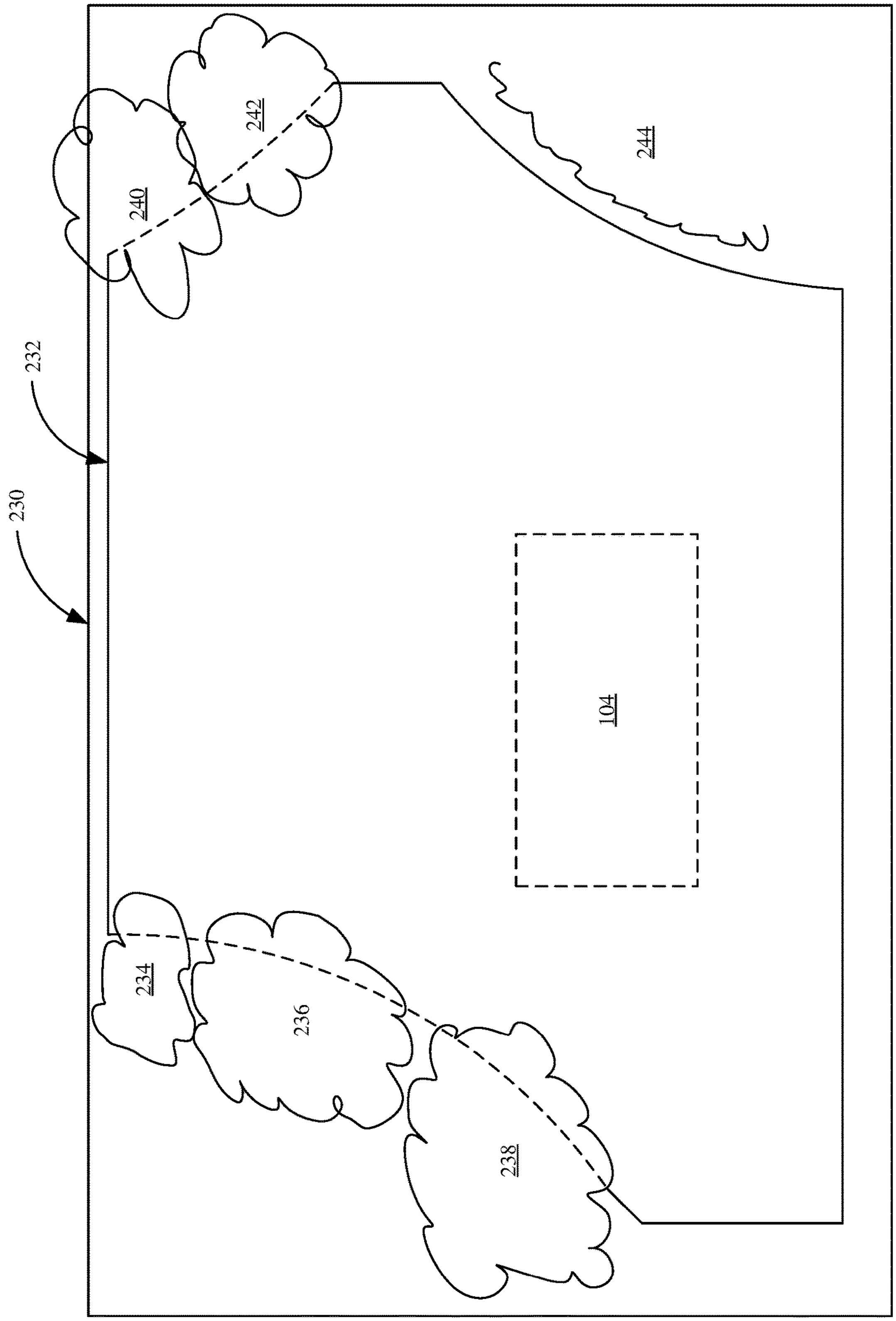

FIG. 6 shows one example of a mowing area defined in the yard shown in FIG. 5.

Figure 7:
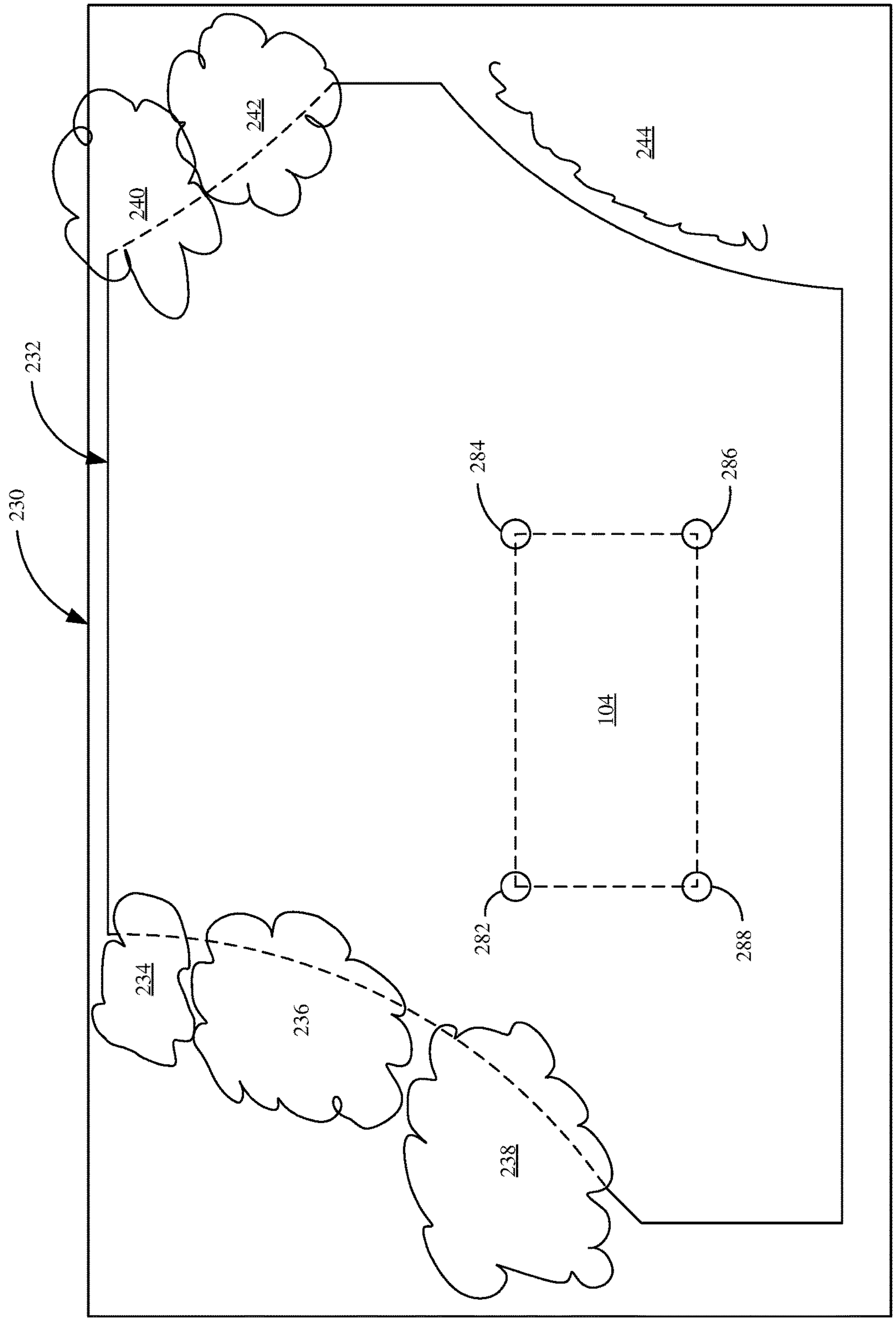
Figure 8:
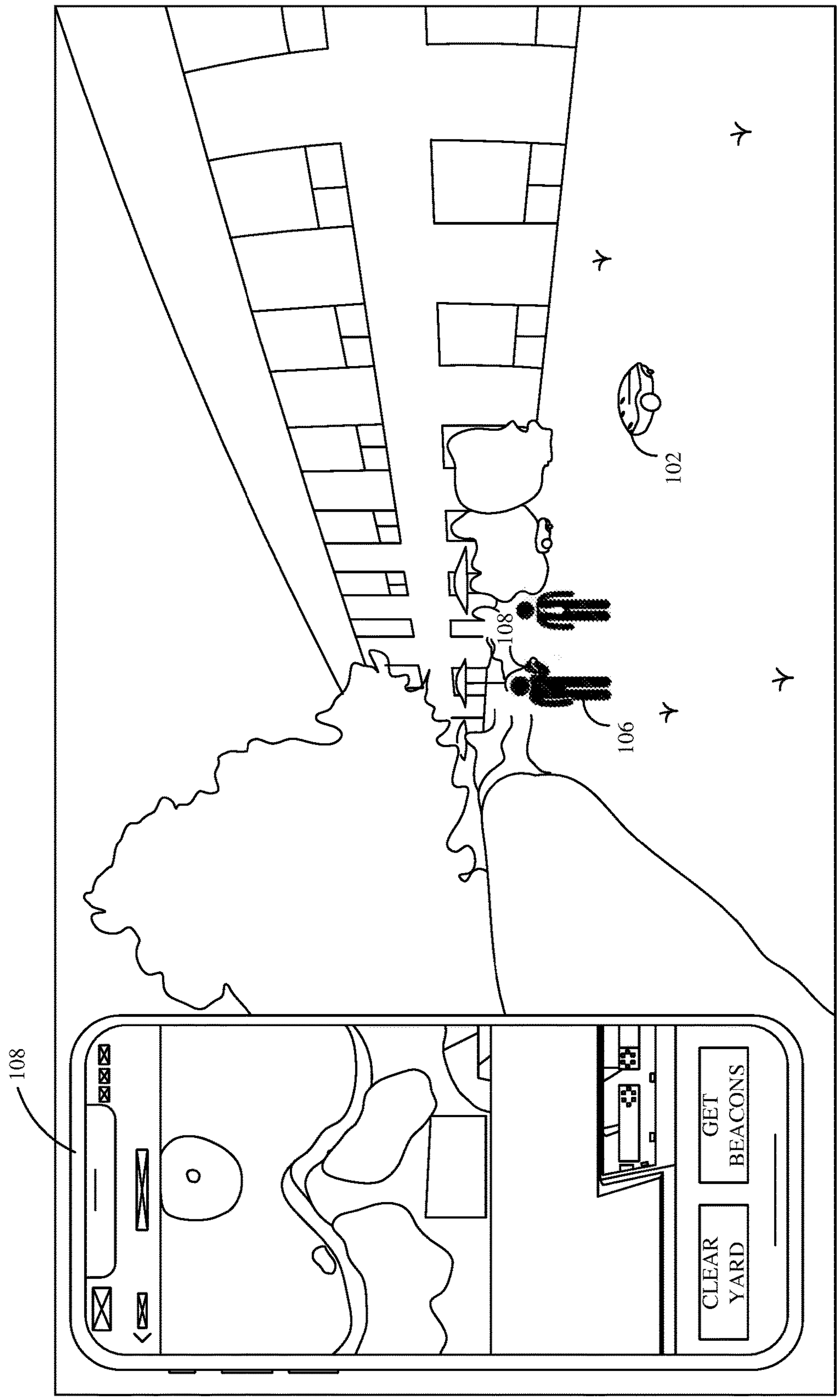

FIG. 7 shows one example of a beacon configuration for the mowing area illustrated in FIG. 6.

FIGS. 8, 9, 10 and 11 show the operation of an augmented reality system in guiding a user to deploy beacons at beacon locations.

Figure 12:
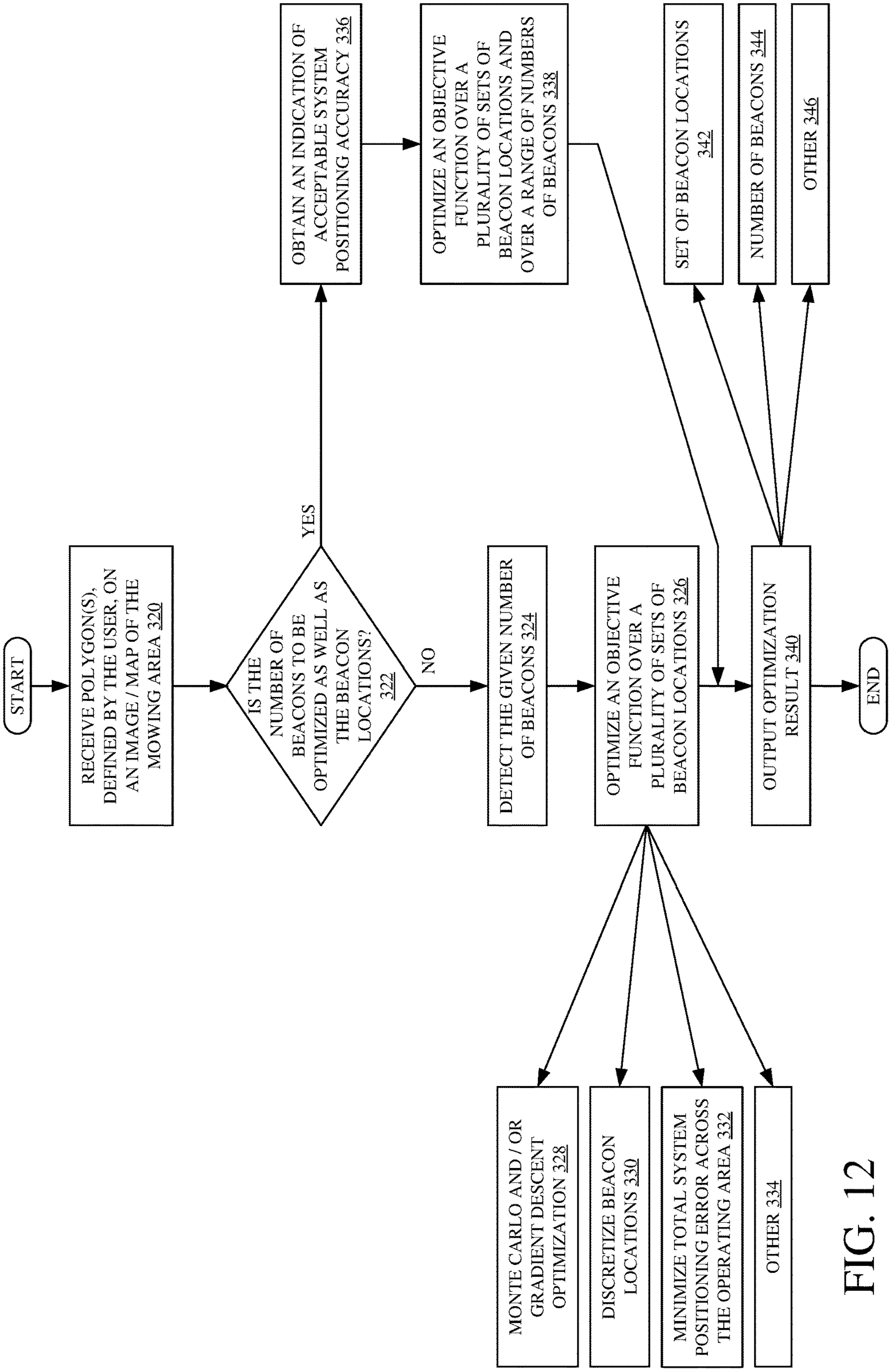

FIG. 12 is a flow diagram illustrating one example of how a beacon configuration is obtained.

Figure 13:
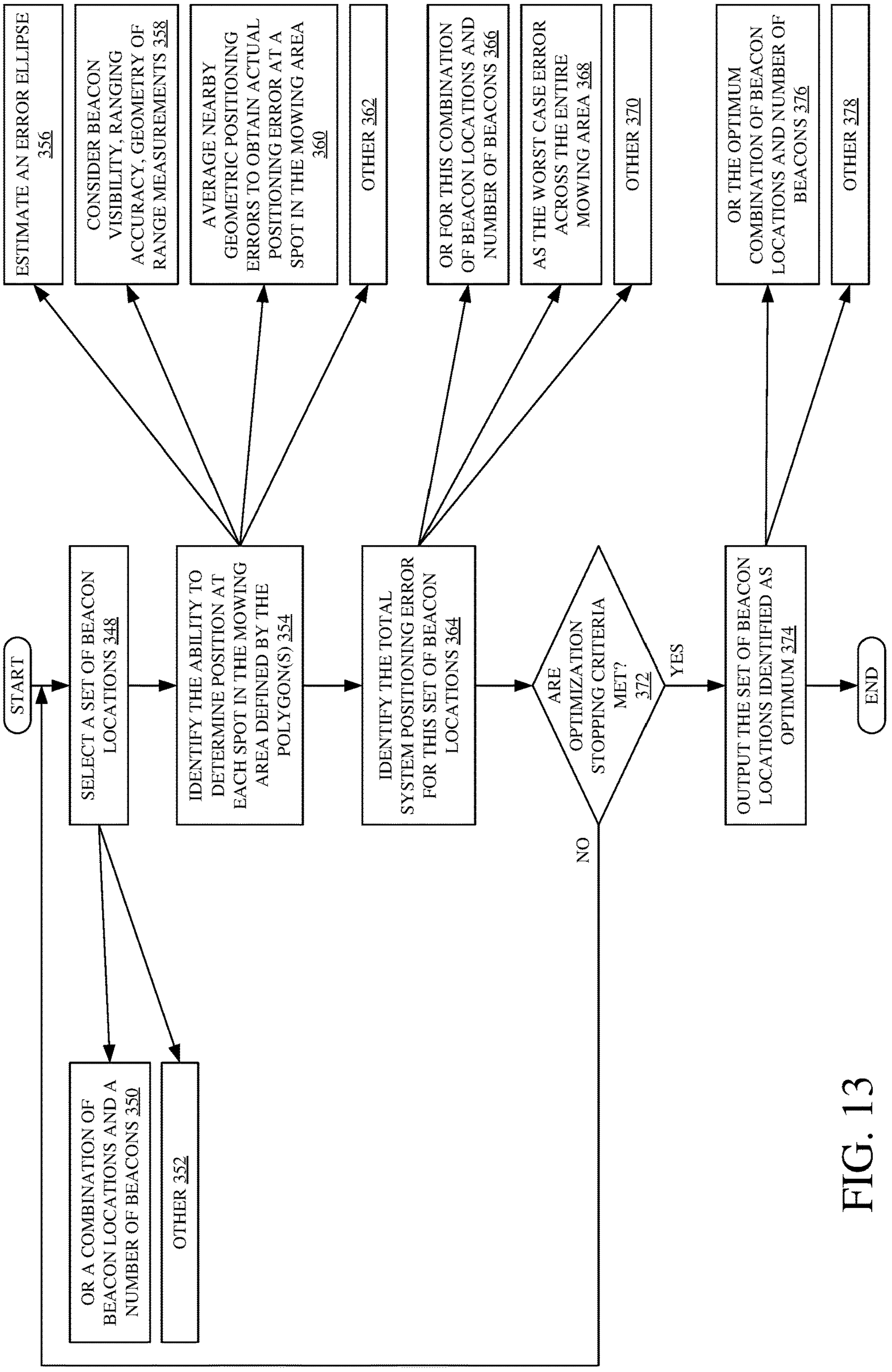

FIG. 13 is a flow diagram showing one example of how the beacon configuration is obtained, in more detail.

Figure 1:
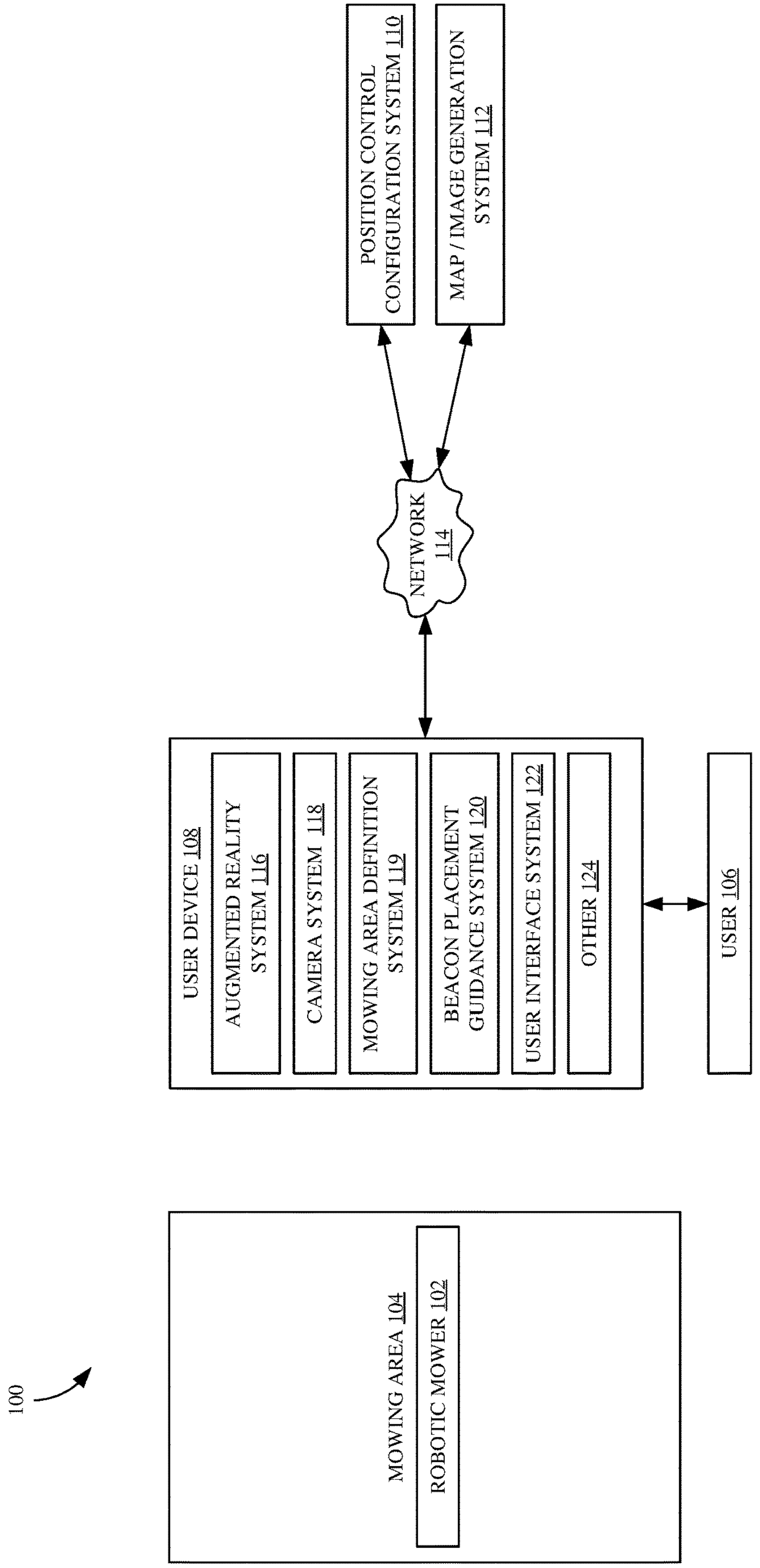
FIG. 1 is a block diagram showing one example of a mower positioning system architecture.
Figure 14:
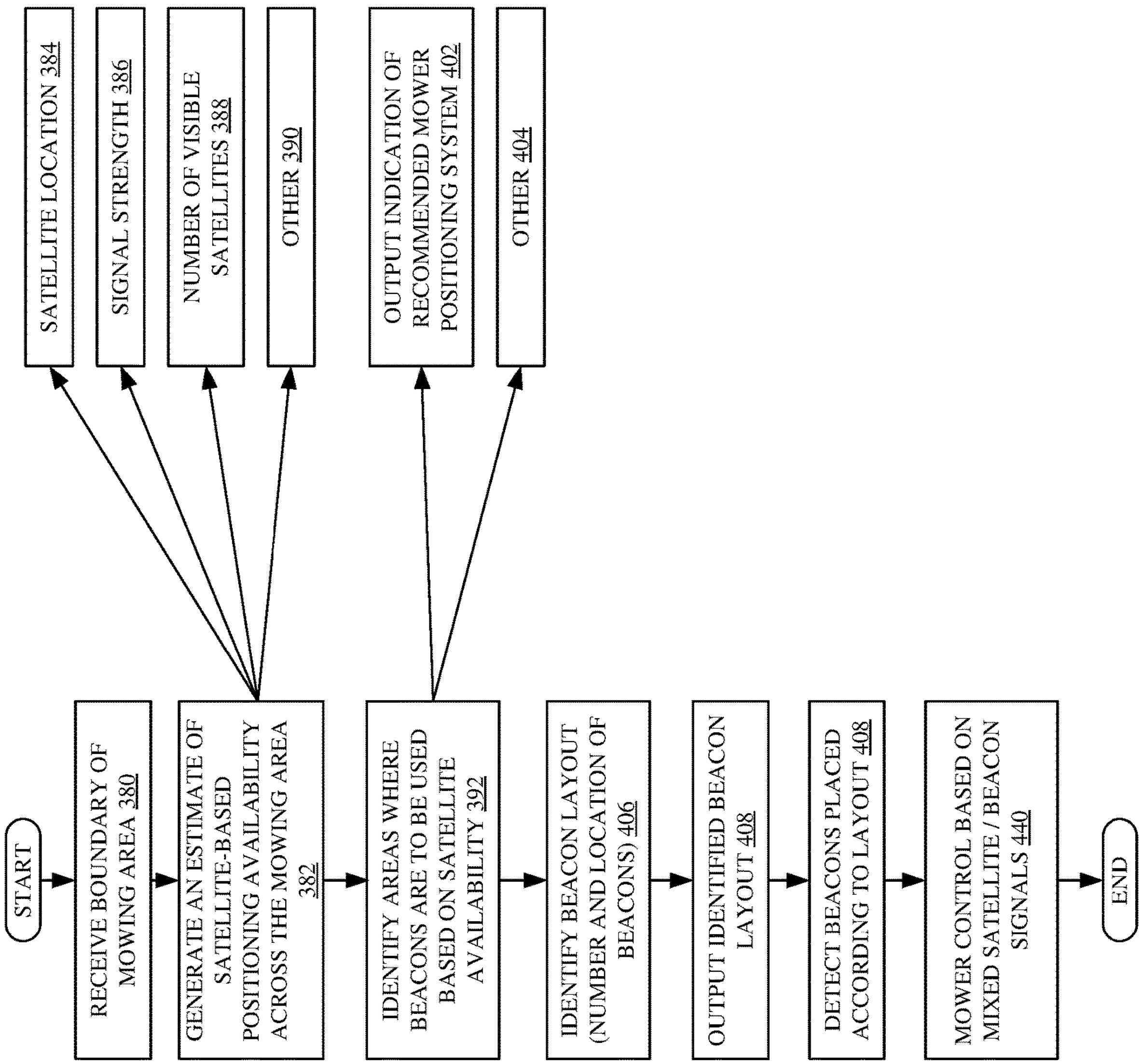

FIG. 14 is a flow diagram illustrating one example of the operation of the architecture illustrated in FIG. 1 in identifying a level of connectivity in a mowing area.

Figure 15:
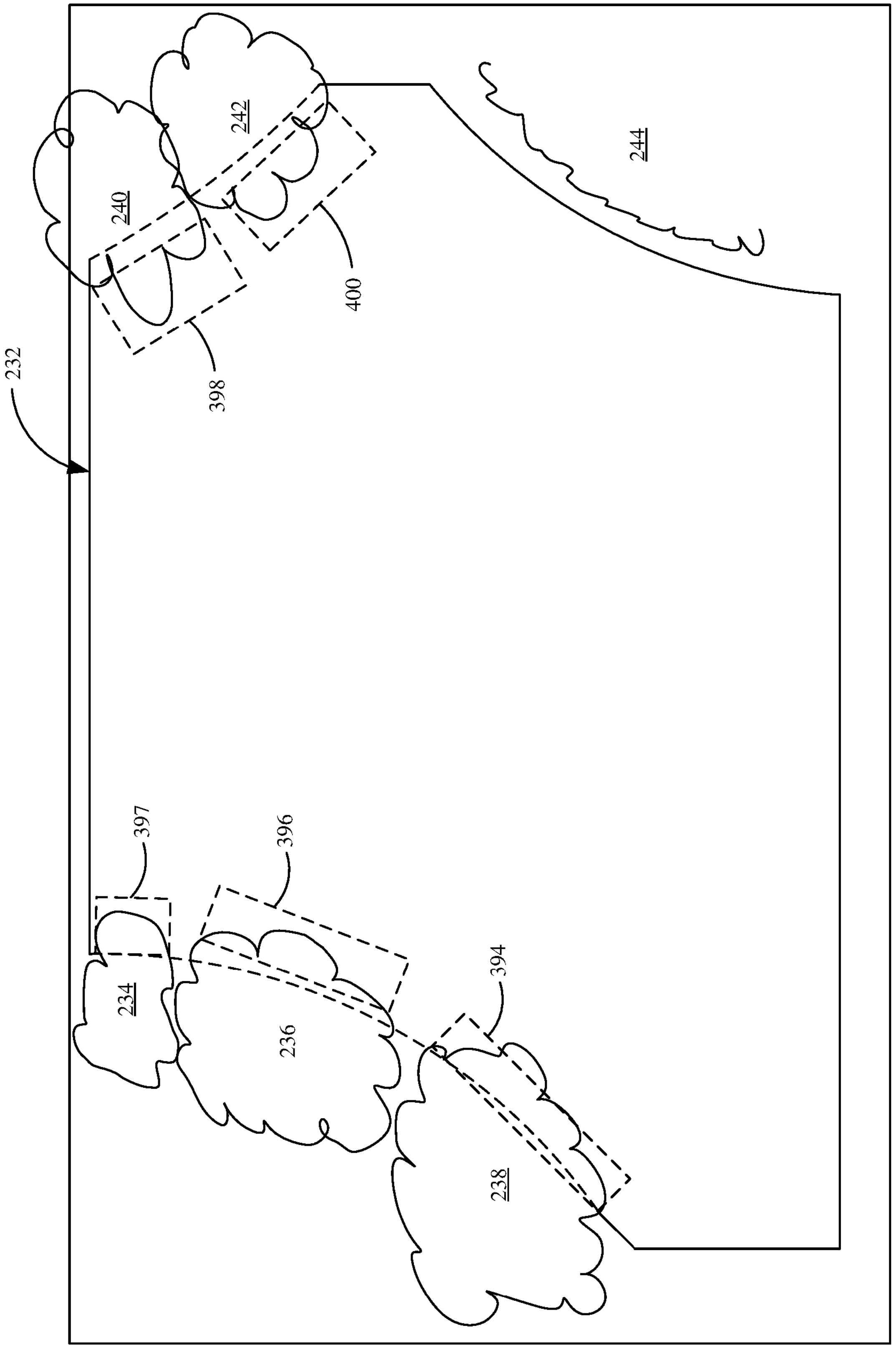

FIG. 15 is a pictorial illustration showing areas where satellite-based positioning may be ineffective and where UWB beacons may be used.

Figure 16:
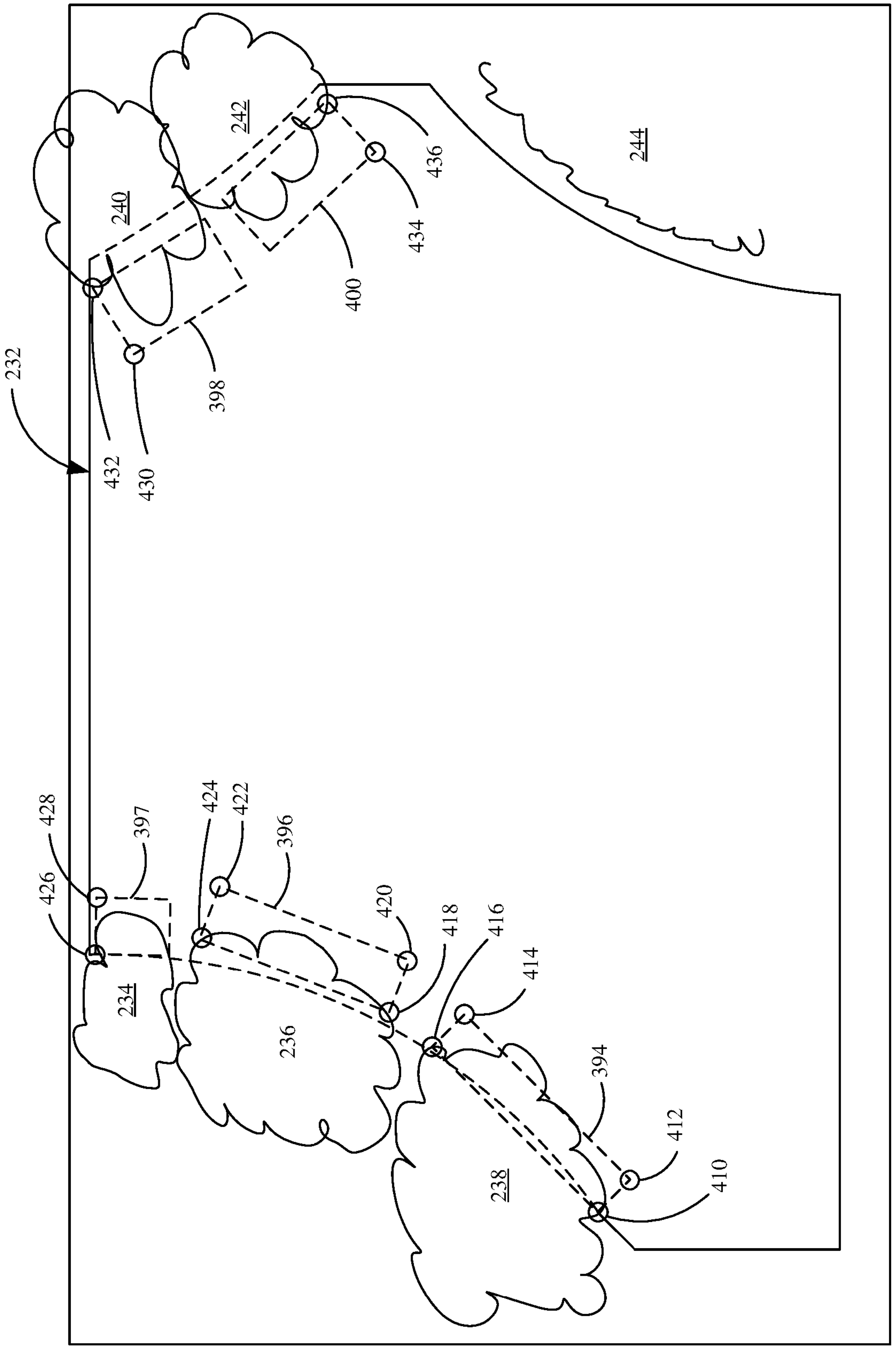

FIG. 16 is a pictorial illustration showing one example of a set of beacon locations for the areas identified in FIG. 15.

Figure 17:
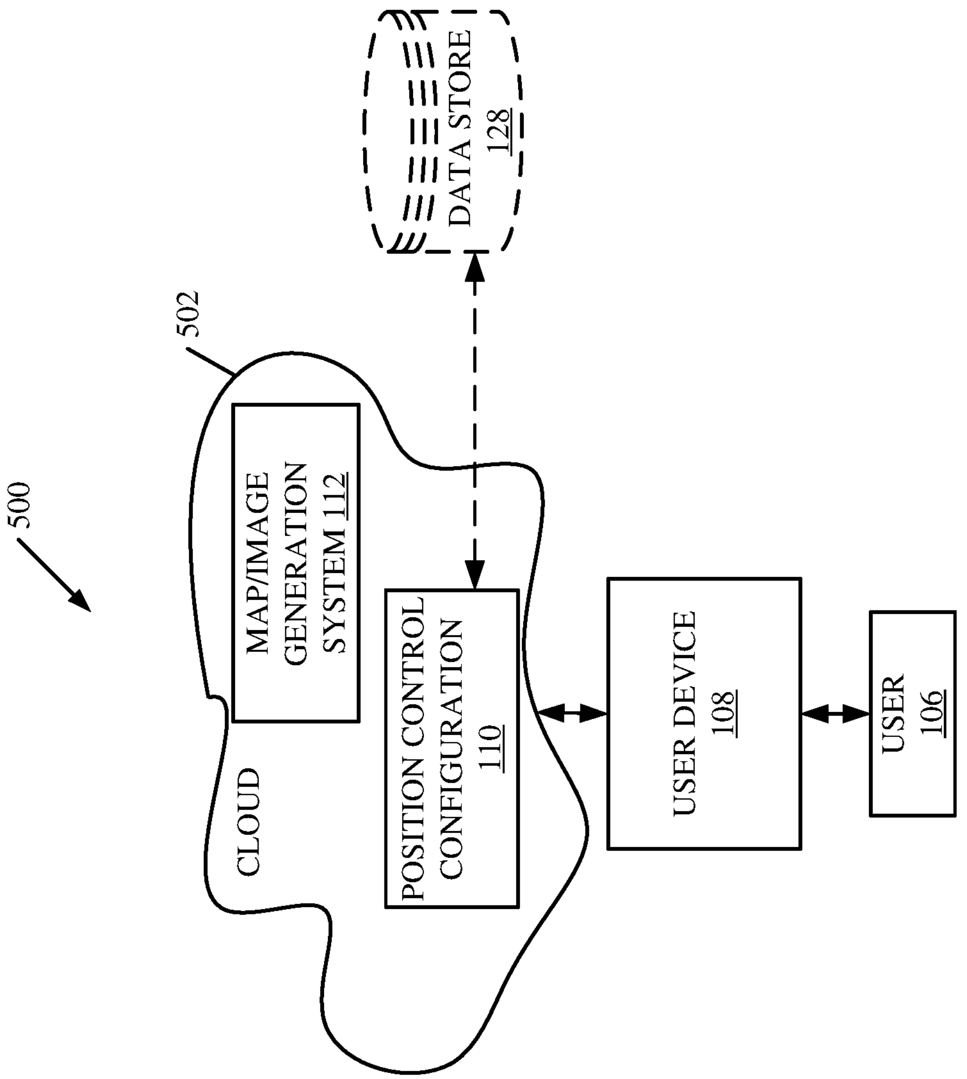

FIG. 17 shows one example of the architecture illustrated in FIG. 1, deployed in a remote server architecture.

Figure 18:
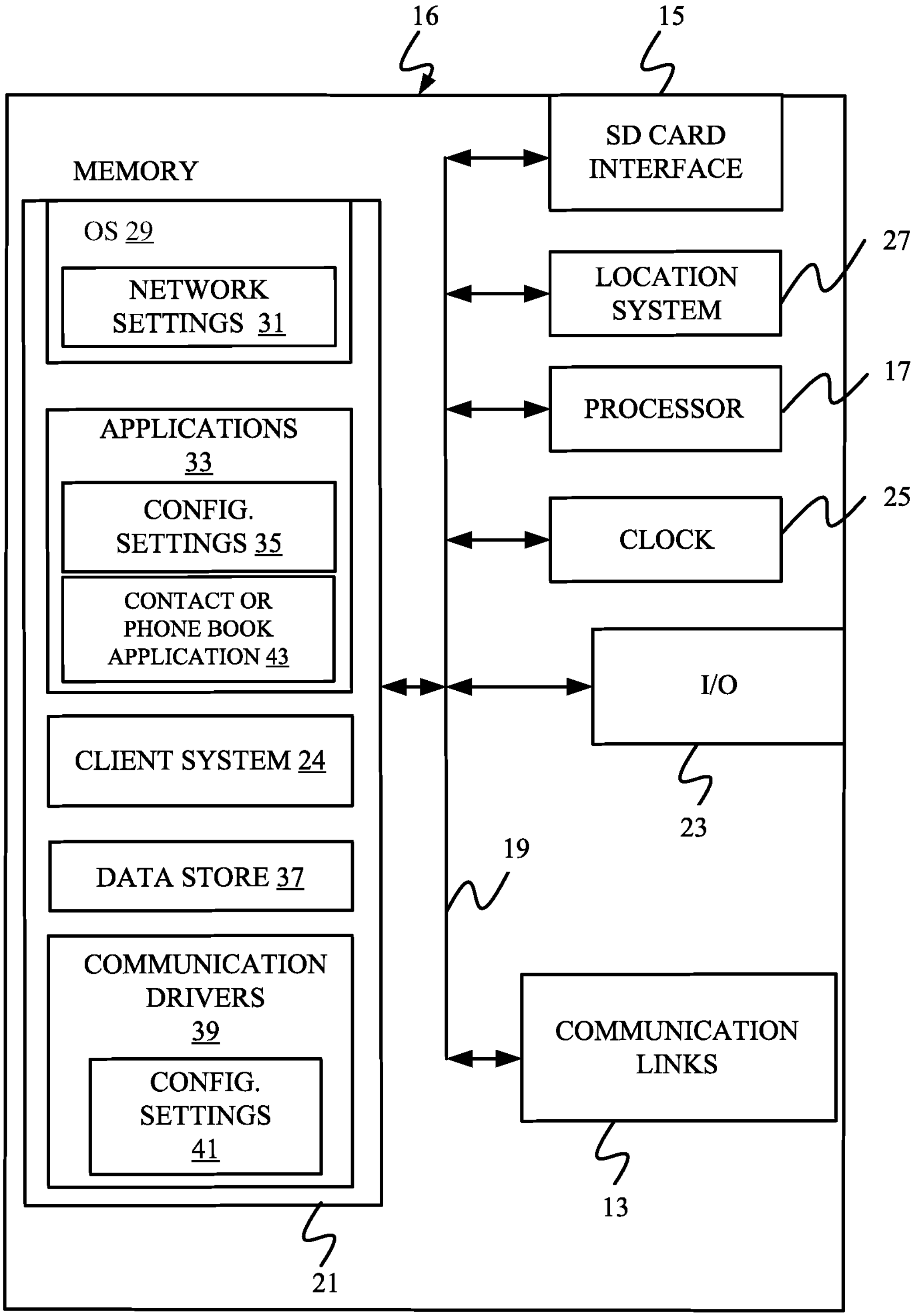
Figure 19:
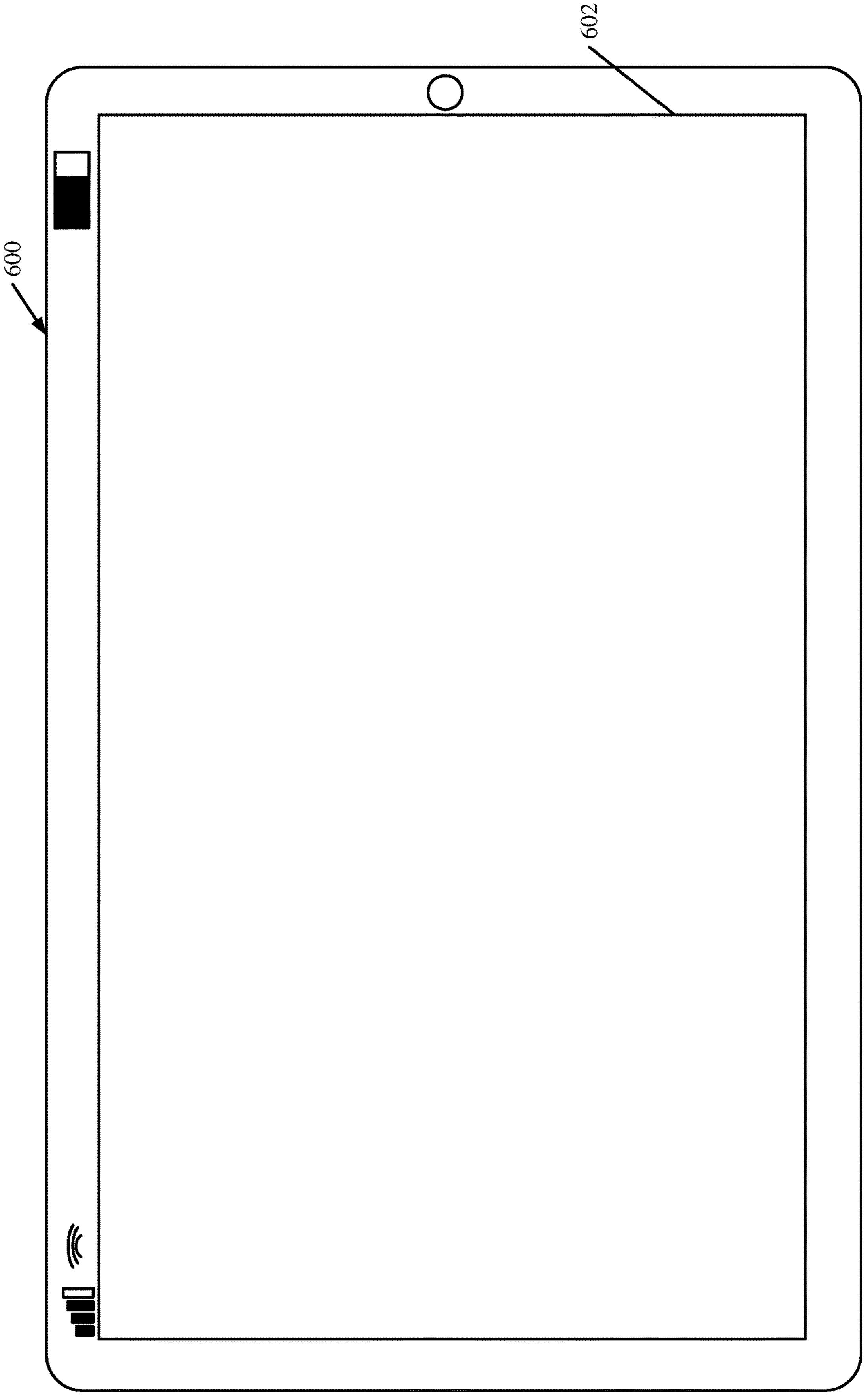
Figure 20:
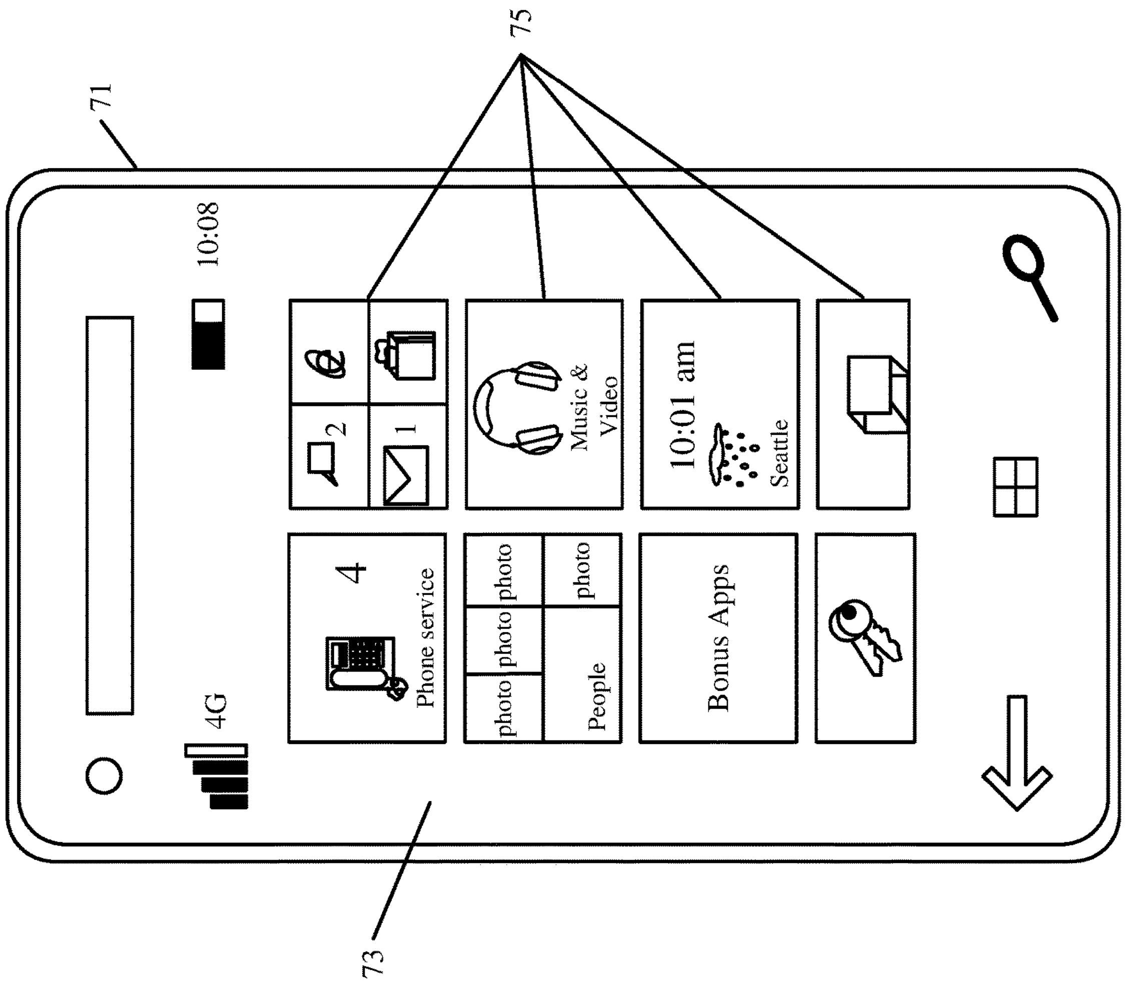

FIGS. 18-20 show examples of mobile devices that can be used in the architectures described herein.

Figure 21:
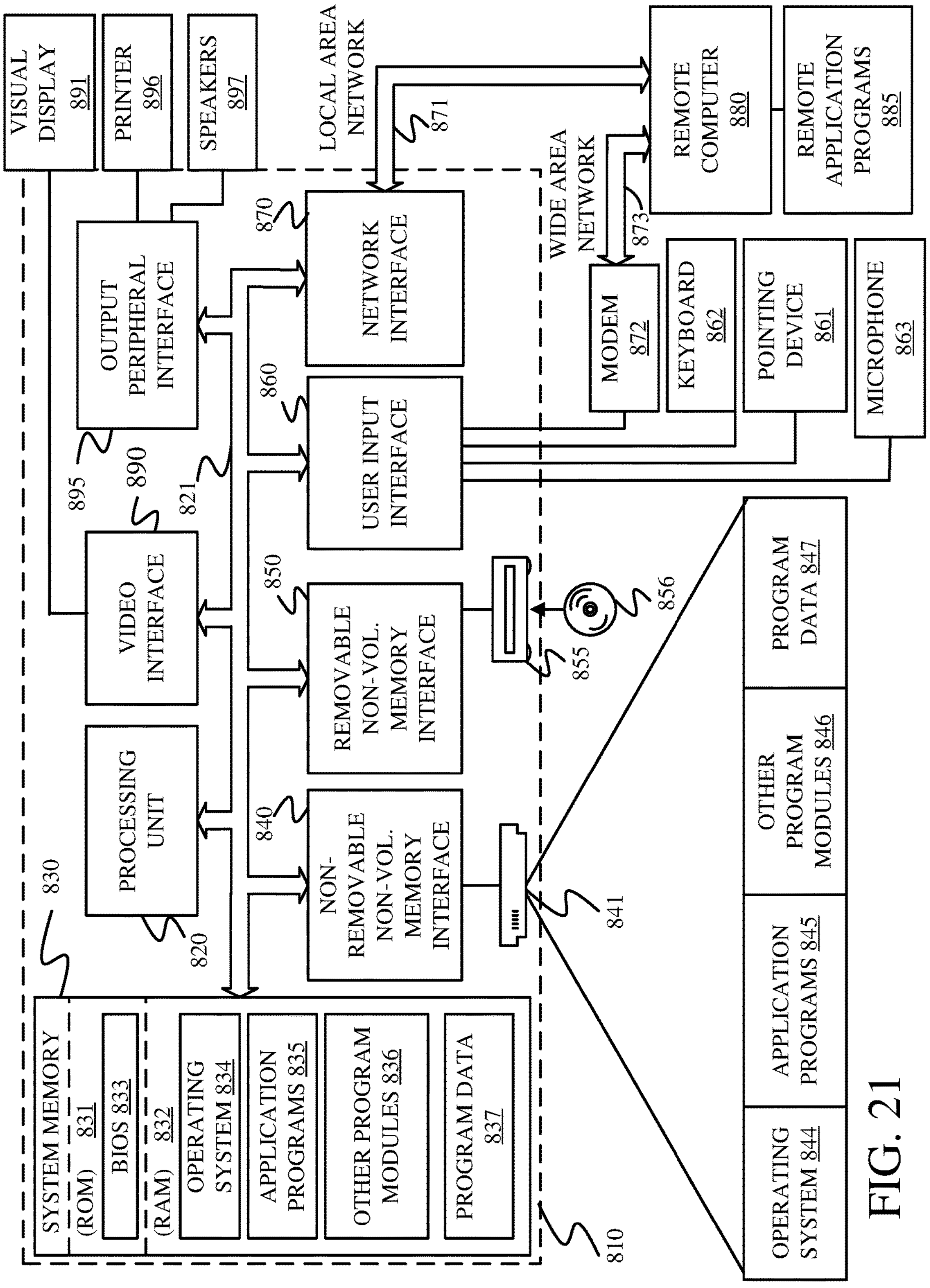

FIG. 21 is a block diagram showing one example of a computing environment that can be used in the architectures described herein.

DETAILED DESCRIPTION

As discussed above, some systems have users place beacons about an area to be mowed. The beacons operate as a localization system to provide a network of support and location tracking to the robotic mower. Thus, some mowers are provided with an ultra-wide band (UWB) positioning system that relies on transmissions from beacons in order to navigate in the mowing area. In other systems, satellite-based positioning systems (such as GPS, GNSS, etc.), can be used with mowers that are equipped with a receiver that receives the position signals from satellite-based transmitters. Some mowers have technology which includes both a UWB positioning system and a satellite-based positioning system. In such mowers, both types of connectivity capabilities are provided in the robotic mower to ensure that positioning system connection is continuously maintained with the mower. In these types of systems, the autonomous mower that is moving within the boundary limits needs to be tracked so it can provide the user with the position of the robotic mower on the lawn, and the mower also needs to measure its relative distance to the lawn boundaries.

One problem with relying on satellite-based location tracking for managing the operation of the robotic mower is that certain areas of the target mowing area, particularly those in proximity to tall yard features (such as trees or bushes) or areas where lawn boundaries are near buildings, is that those areas are obstructed from satellite reception. Thus, the mower does not receive the satellite-based signals and may operate outside of the target mowing area, or not operate as desired, in other ways. One problem with using a UWB beacon-based positioning system is that the user must attempt to place the beacons in a configuration that will work well in positioning the mower. This can be very difficult.

The present description thus proceeds with respect to a system that allows a user to define a mowing area boundary on an image (such as a satellite image) on the touch sensitive screen of a mobile device, or in other ways. In one example, a position control system receives the user-defined mowing area boundaries and identifies a set of beacon locations, where a set of UWB beacons can be deployed, so that the mower can operate, as desired, within the defined mowing area. In yet another example, the system can also identify the desired number of beacons that should be deployed, as well as the location where they are to be deployed. 2

Once the number of beacons, and their location, have been identified, an augmented reality system can be used to guide the user to those locations to deploy the beacons. For instance, display elements can be provided on a camera view display of the user's mobile device, directing the user toward the beacon locations.

Once the beacons are deployed according to the desired configuration, the beacons can communicate with one another, and with the mower, to provide a localization system of interconnected beacons that transmit signals that can be used by the mower for guidance, navigation, and to provide a user with a continuously updated mower location.

In yet another example, the position control configuration system receives the delineation of the mowing area on the image and can perform a number of different functions. For example, it can estimate the connectivity available across the mowing area, of satellite-based position signals. It can identify areas with low estimated satellite connectivity as areas that may need to be augmented by a UWB beacon system. It can then provide a beacon configuration which specifies locations for the beacons, in those areas.

FIG. 1 is a block diagram of one example of a mower positioning system architecture 100. Architecture 100 shows that a robotic mower 102 is deployed in a mowing area 104, which may be an area of a worksite (such as a lawn to be mowed) or other mowing area. A user 106 interacts with a user device 108. The user device 108 has access to a position control configuration system 110 and a map/image generation system 112, over network 114. Network 114 can thus be a wide area network, a local area network, a near field communication network, a cellular communication network, or any of a wide variety of other networks or combinations of networks. It will also be noted that position control configuration system 110 can be disposed on robotic mower 102 or user device 108 or elsewhere, or it could be distributed among various locations. It is shown separately, as a remote system in FIG. 1, for the sake of example only.

In one example, user 106 can obtain a geographical representation (e.g., a satellite image or map) of the mowing area 104 from map/image generation system 112. User 106 can then define a boundary of mowing area 104 on the map or image and provide an indication of that bounded mowing area 104 to position control configuration system 110. In one example, position control configuration system 110 identifies the number of ultra-wide bandwidth (UWB) beacons, and the locations for those beacons—where they should be deployed to provide a localization system to robotic mower 102 so that mower 102 can accurately navigate within mowing area 104.

In one example, user device 108 includes augmented reality system 116, camera system 118, mowing area definition system 119, beacon placement guidance system 120, user interface system 122, and it can include a wide variety of other user device functionality 124. Once user device 108 receives the beacon configuration (e.g., the number of beacons and the desired locations for those beacons) from position control configuration system 112, augmented reality system 116 can be controlled by beacon placement guidance system 120 to generate an augmented reality display on the camera view of user device 108 generated by camera system 118. The augmented reality display may include arrows or other user guidance display elements that direct the user 106 to walk through mowing area 104 to a location where a beacon is to be placed. The augmented reality display can also identify to the user the precise location where the beacon is to be placed.

Once user 106 indicates that a beacon has been placed at the desired location (e.g., by actuating an actuator on the display on user device 108), then beacon placement guidance system 120 can control the augmented reality display to provide an arrow or other user guidance display element to direct user 108 to walk to another location on mowing area 104, where the next beacon is to be placed. This continues until all beacons are placed to define mowing area 104. The s beacons then communicate with one another and mower 102 to provide mower 102 with guidance and navigation so that it can mow area 104.

In another example, position control configuration system 110 can identify areas of the bounded mowing area provided on the image from user device 108 that may have good satellite-based connectivity. It may identify other areas that have poor satellite-based connectivity. For the areas with poor satellite-based connectivity, system 110 may identify a number and location of UWB beacons that should be deployed at those locations so that robotic mower 102 can operate using satellite-based positioning in areas where satellite-based connectivity is of high quality, and can use UWB beacon-based positioning where satellite-based connectivity is of low quality.

Figure 2:
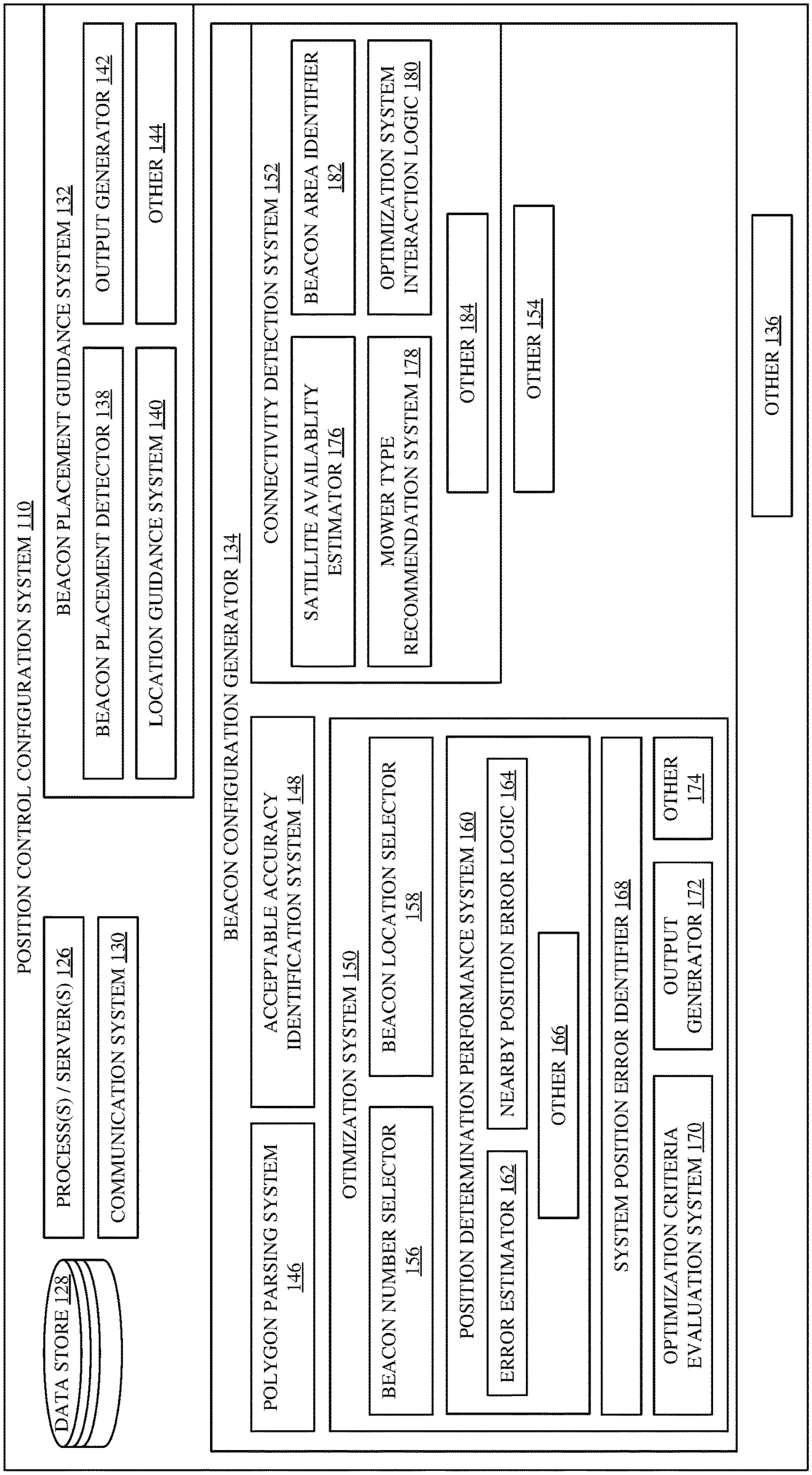
FIG. 2 is a block diagram showing one example of a position control configuration system in more detail.

FIG. 2 is a block diagram showing one example of position control configuration system 110, in more detail. FIG. 2 shows that, in one example, position control configuration system 110 includes one or more processors or servers 126, data store 128, communication system 130, beacon placement guidance system 132, beacon configuration generator 134, and it can include a wide variety of other items 136. Beacon placement guidance system 132, as is described below, can be placed on user device 108, as system 120, or it can be placed on system 110, as beacon placement guidance system 132, or it can be distributed among the mower and system 110, or it can be placed on both the mower and system 110.

In the example shown in FIG. 2, beacon placement guidance system 132 includes beacon placement detector 138, location guidance system 140, output generator 142, and it can include other items 144. Beacon configuration generator 134 can include polygon parsing system 146, acceptable accuracy identification system 148, optimization system 150, connectivity detection system 152, and it can include other items 154. Optimization system 105 can include beacon number selector 156, beacon location selector 158, position determination performance 11 system 160 (which, itself, can include error estimator 162, nearby position error logic 164, and other items 166), system position error identifier 168, optimization criteria evaluation system 170, output generator 172, and it can include other items 174. Connectivity detection system 152 can, itself, include satellite availability estimator 176, mower type recommendations system 178, optimization system interaction logic 180, beacon area identifier 182, and it can include other items 184. Before describing the overall operation of system 110 in more detail, a brief description of some of the items in position control configuration system 110, and their operation, will first be provided.

Communication system 130 illustratively enables the items on position control configuration system 110 to communicate with one another, and to communicate over network 114 with other items in architecture 100. Thus, communication system 130 can be a near field communication system, a wide area network communication system, a cellular communication system, or any of a wide variety of other communication systems that enable the types of communications needed.

Beacon configuration generator 134 illustratively generates a beacon configuration indicating where UWB beacons should be placed in order to obtain effective mower guidance and navigation. Polygon parsing system 146 receives the marked-up satellite image or other image provided by the user 106, that delineates the area to be mowed. System 146 illustratively identifies polygons, within the marked area, that can be processed. Optimization system 150 then generates an output indicating the optimum placement (or desired placement) of the beacons. It can also output an optimum or desired number of beacons. Where the number of beacons is to be identified by system 150, then acceptable accuracy identification system 148 obtains an acceptable positioning accuracy within the mowing area. This can be input by the user, it can be obtained from data store 128, or it can be obtained in other ways. Given the acceptable accuracy, optimization system 150 generates an output identifying the minimum number of beacons that are needed, and their specific locations where they are to be placed, to obtain adequate positioning in the mowing area.

In order to do this, optimization system 150 uses beacon number selector 150 to select a number of beacons, and uses beacon location selector 158 to select a set of locations for those beacons. Position determination performance system 160 determines the estimated performance of the positioning system in guiding mower 102 given the selected number of beacons and the selected locations. In doing so, error estimator 162 estimates the positioning error that will be seen at different spots in the mowing area, given the current number of selected beacons and the currently selected beacon locations. Nearby position error logic 164 averages errors of nearby locations to obtain an actual error value for each spot in the mowing area, and system position error identifier 168 identifies a position error for the entire system, given the selected number of beacons deployed at the selected beacon locations. The system position error may illustratively be the objective function that is optimized (e.g., minimized). Optimization criteria evaluation system 170 evaluates the optimization criteria to determine when the number of beacons and their locations are optimized (or, if not optimized, reach a desired level of positioning performance). Output generator 172 then generates an output indicative of the number of beacons and the beacon locations generated by optimization system 150. This output can be provided to beacon placement guidance system 132.

Beacon placement guidance system 132 can generate outputs that can be shown to user 106 on the user device 108. The display can use augmented reality display elements to guide the user to a beacon location so that the user can install or deploy a beacon at the desired location. The user can then actuate an input mechanism indicating that a beacon has been placed. System 132 can then guide the user, through an augmented reality camera view on the user device 108, to the next beacon location so the user can deploy a beacon at that location. This can continue until all beacons are deployed.

By way of example, location guidance system 140 can provide an arrow on the camera view of user device 108 indicating the direction that user 106 should walk toward the next beacon location. Location guidance system 140 can also provide a visual indicator (such as a flag) on the camera view indicating the precise location where the beacon is to be deployed. Once the user deploys the beacon at that location, beacon placement detector 138 can receive a user input indicating that the beacon has been placed, and location guidance system 140 can then generate another guidance indicator guiding the user to the next beacon location. Output generator 142 can prepare the outputs from location guidance system 140 for transmission to user device 108 where they can be displayed using augmented reality system 116 and camera system 118. Also, as discussed above, the guidance system can be deployed on user device 108 as system 120 or it can be distributed.

Returning again to beacon configuration generator 134, it may be that position control configuration system 110 also provides an output indicating whether the mower 102 can use satellite-based positioning information, or whether it needs UWB beacons for positioning. In order to do that, connectivity detection system 152 identifies the satellite-based connectivity that will be available at different points in the mowing area. For instance, satellite availability estimator 176 can access the available satellite locations and signal strengths, as well as the number of visible satellites (given ground impediments) and estimate the strength and availability of the satellite signal at each point in the mowing area. The points may be equally spaced points across the mowing area or irregularly spaced points, based on the topology and obstructions in the mowing area 104, or they can be other points.

Beacon area identifier 182 can identify areas, within the mowing area, where the satellite positioning signal will be weak or unavailable. It can identify those areas as areas that will need to be augmented with UWB beacons for positioning. Those areas can be provided to optimization system 150 by optimization system interaction logic 180, so that optimization system 150 can provide a desired number of beacons and beacons locations, for each of the areas where UWB beacons are needed in the mowing area, to augment satellite-based positioning signals.

In addition, it may be that there are different mowers available to user 106. It may be that one type of mower has a satellite-based positioning system, while another has a UWB beacon-based positioning system. In yet another example, the mower has both types of systems that can work together to navigate and guide the mower. In that case, mower type recommendation system 178 can generate an output indicative of a recommended mower type for the mowing area. This may be based upon the satellite connectivity in that area, as well as the geography or terrain in the area, among other things.

Figure 3:
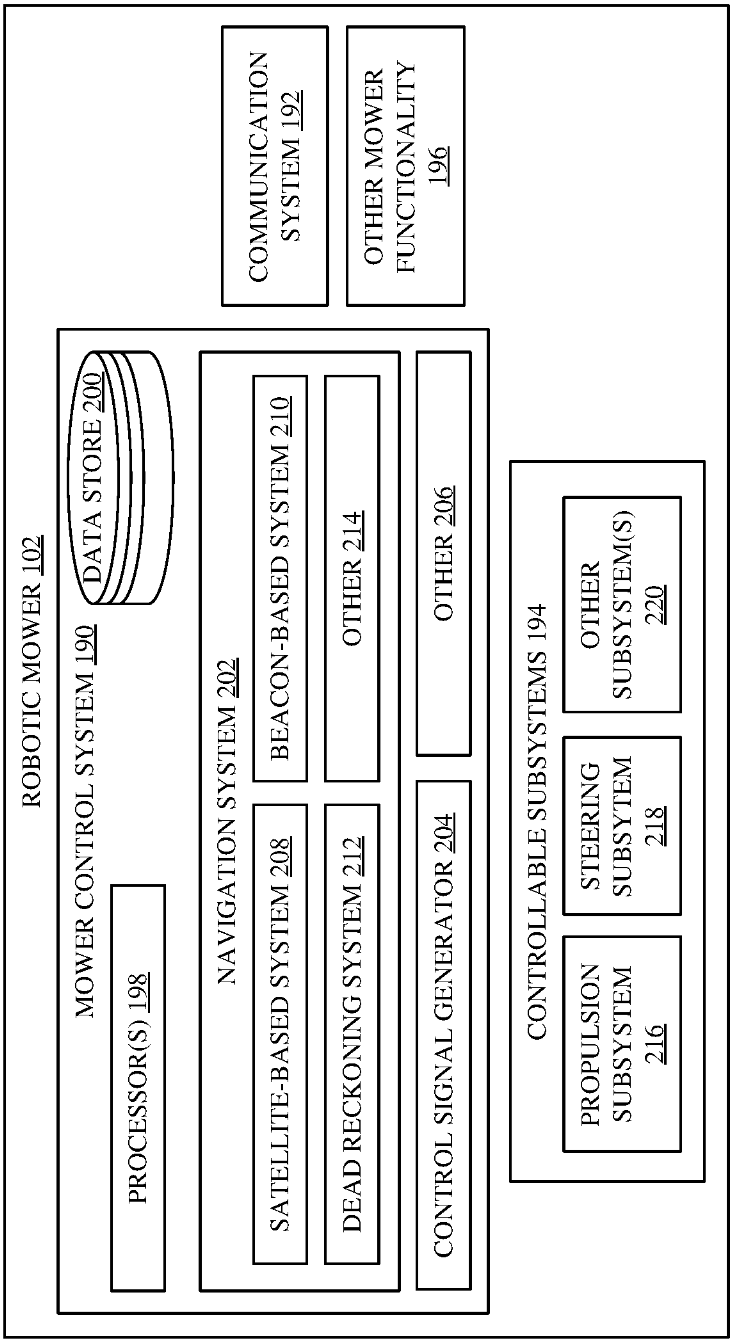
FIG. 3 is a block diagram showing one example of a mower in more detail.

FIG. 3 is a block diagram showing one example of robotic mower 102, in more detail. Robotic mower 102 illustratively includes mower control system 190, communication system 192, controllable subsystems 194, and it can include a wide variety of other mower functionality 196.

Mower control system 190, itself, can include one or more processors 198, data store 200, navigation system 202, control signal generator 204, and it can include other items 206. Navigation system 202 can include a satellite-based system 208, a beacon-based system 210, a dead reckoning system 212, and/or a wide variety of other items 214.

Controllable subsystems 194 can include a propulsion subsystem 216, a steering subsystem 218, and a wide variety of other controllable subsystems 220. Navigations system 202 illustratively receives positioning signals and generates navigation outputs to control signal generator 204. Satellite-based system 208 can receive satellite-based position signals, while beacon-based system 210 can receive UWB beacon-based signals. Dead reckoning system 212 can receive inputs from such things as accelerometers, inertial measurement units, wheel speed sensors, dimensional information, and other items that can be used to generate position signals based upon dead reckoning.

It will be noted that, in some examples, mower 102 is fitted with all three positioning systems 208, 210 and 212. In other examples, it may be fitted with one or two of those systems. The systems 208, 210 and 212 identify the position of mower 102 in a local or global coordinate system and relative to the boundaries of the mowing area. The boundaries of the mowing area can be determined based upon the positioning signals transmitted from the UWB beacons, or in other ways. Thus, navigations system 202 can generate outputs that are used by control signal generator 204 to control the controllable subsystems 194 in order to navigate mower 102 about, within the mowing area, and without crossing the boundaries.

Control signal generator 204 can generate control signals to control propulsion system 216 which is used to propel mower 102 in both the forward and reverse directions. Steering system 218 can be controlled in order to control the heading of robotic mower 102. A wide variety of other subsystems 220 can be controlled as well.

Communication system 192 can be used to communicate over any of a wide variety of different types of networks (some of which are described above with respect to network 114 in FIG. 1). Thus, communication system 192 can communicate the location, orientation, heading, etc., of robotic mower 102 to any user 106 through user device 108, or to any of a wide variety of other systems.

Figure 4:
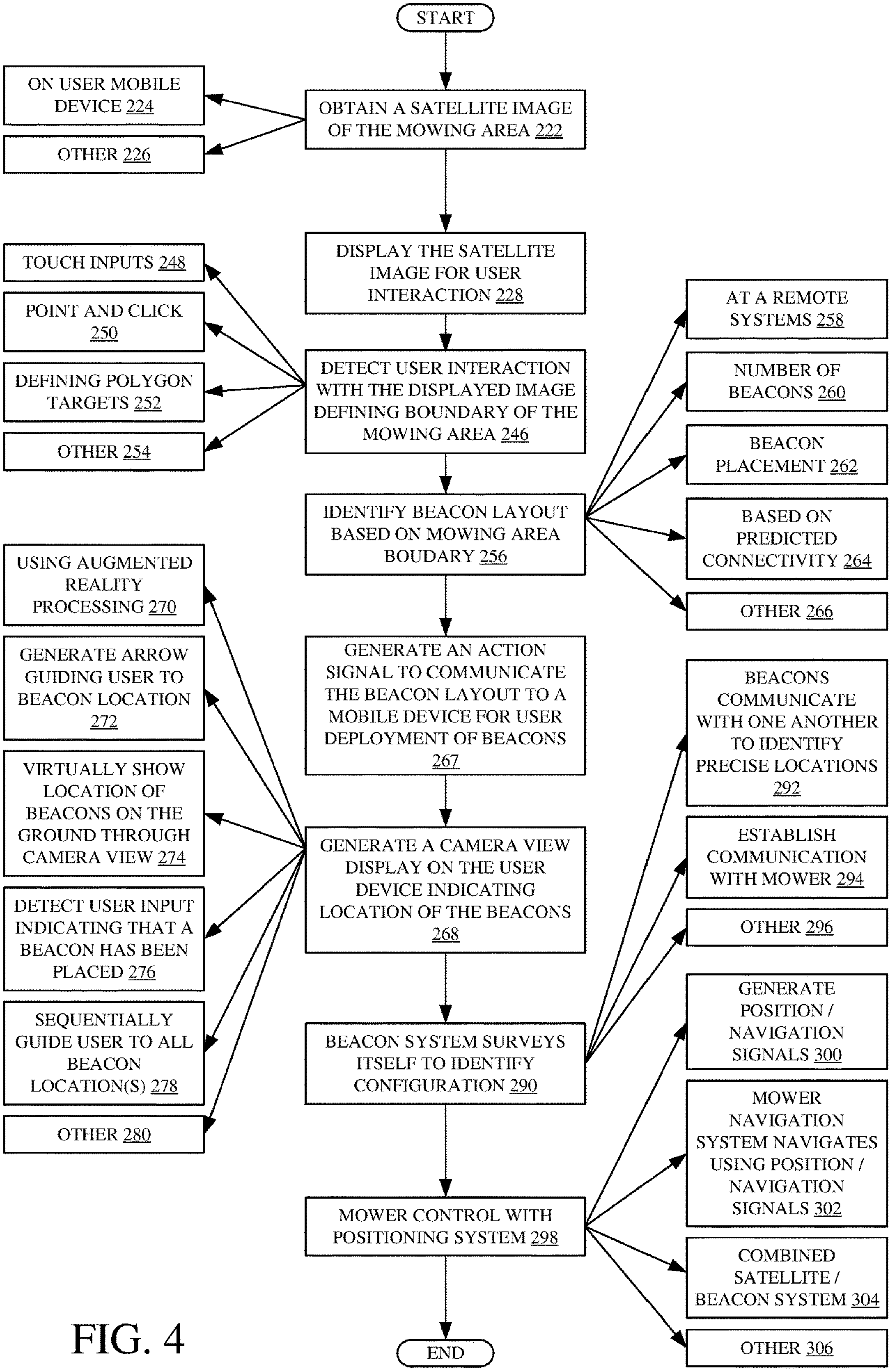
FIG. 4 is a flow diagram illustrating one example of the operation of the items in the architecture, illustrated in FIG.

FIG. 4 is a flow diagram illustrating one example of the operation of the architecture shown in FIG. 1 in receiving a defined mowing area from user 106, and identifying a beacon configuration for UWB beacons that can be deployed to position mower 102 in the mowing area 104. It is first assumed that the user device 108 obtains a satellite image (or a map image or another geographical representation) of the worksite that includes the mowing area 104. This is indicated by block 222 in the flow diagram of FIG. 4. This can be done by user 106 using a mobile device 108 to obtain a map or image from map/image generation system 112. This is indicated by block 224. By way of example, a positioning system (e.g., a GPS system) on user device 108 may transmit its location to map/image generation system 112. System 112 can then return a satellite image that user 106 can interact with (e.g., to magnify or reduce it, to span or scroll it, draw on it, etc.). The image or map can be obtained in other ways as well, and this is indicated by block 226. User device 108 then displays the geographical representation (in the present example, a satellite image) for user interaction on user device 108. This is indicated by block 228. By way of example, FIG. 5 shows a user interface display 230 that has a yard 232. The yard (or worksite) 232 may have trees 234-242, shrubs 244, and other items. Mowing area definition system 119 then displays the image 230 to user 106 for user interaction. User 106 then interacts with the display 230 in order to define a mowing area 104 that the user wishes to have the robotic mower 102 mow. For instance, user device 108 may have a touch sensitive display. In that case, the user can provide touch inputs to define the mowing area 104. The user can, for example, trace an area that the user wishes to have mowed. Using mowing area definition system 119 to detect user interaction with the displayed image to define a boundary of the mowing area is indicated by block 246. Detecting touch inputs is indicated by block 248. Of course, the user 106 can interact with the display in other ways, to define the mowing area, as well. For instance, the user can use a point and click device (as indicated by block 250, in FIG. 4) or other items.

Based upon the detected user input, either mowing area definition system 119 or position control configuration system 110 defines one or more polygons within the traced area. This is indicated by block 252 in the flow diagram of FIG. 4. The user can interact with the displayed image in other ways, and the mowing area can be defined and identified in other ways as well, and this is indicated by block 254.

Beacon configuration generator 134 (FIG. 2) then identifies a beacon layout for the UWB beacons based upon the mowing area boundary that has been detected. This is indicated by block 256 in the flow diagram of FIG. 4.

The beacon configuration generator 134 can be located in a remote system (such as in the cloud or other remote server location) so that the beacon configuration can be identified at the remote location and transmitted back to user device 108. This is indicated by block 258. In one example, the beacon layout can identify the number of beacons 260, and the location where the beacons are to be placed to define the mowing area at the worksite. This is indicated by block 262. The beacon layout can be based on predicted connectivity within the mowing area, or in other ways. This is indicated by blocks 264 and 266 in the flow diagram of FIG. 4. An action signal can then be generated based on the beacon layout, or beacon configuration. This is indicated by block 267.

In one example, beacon placement guidance system 132 (or system 120 on mobile device 108) can then be used to guide user 106 to the beacon locations in order to place the beacons at the positions identified in the beacon layout. Where beacon placement guidance system 132 is disposed on configuration system 110, then an action signal can be generated to transmit the guidance using communication system 130 to user device 108. In another example, the beacon placement guidance system is disposed on user device 108, as system 120. In that case, an action signal can be generated to transmit the beacon configuration identified by beacon configuration generator 134 to user device 108 and guidance system 120 can use it to guide user 106 to the proper placement of the beacons. Either way, the guidance system (either guidance system 132 or 120) uses augmented reality system 116 to generate a camera view display on camera system 118 indicating the location of the beacons. This is indicated by block 268 in the flow diagram of FIG. 4. As mentioned, this can be done using augmented reality processing by augmented reality system in order to superimpose display elements over the camera view to guide the user 106. Using augmented reality processing is indicated by block 270 in the flow diagram of FIG. 4.

For instance, the guidance system (120 or 132) can control augmented reality system 116 to generate an arrow on the camera display that guides the user to the beacon locations in the beacon layout. This is indicated by block 272. Flags or other augmented reality display elements can be shown on the camera display to virtually show the location of the beacons on the ground, through the camera view. This is indicated by block 274.

Also, in another example, beacon placement guidance system 120 or 132 can generate a beacon placement user input mechanism. The user can actuate that mechanism, when the user has placed one of the beacons. Guidance system 120 or 132 can then detect the user input on the beacon placement user input mechanism indicating that a beacon has been placed. This is indicated by block 276. System 120 or 132 can then sequentially guide the user to all of the beacon locations (e.g., it can guide the user to the next closest beacon location) for beacon placement. This is indicated by block 278. A display can be generated on a camera view display on the user device 108 indicating the location of the beacons in other ways as well, and this is indicated by block 280.

FIG. 7 shows an example in which the mowing area 104 has been traced out by user 106 on user device 108, and a beacon configuration has indicated that beacons are to be placed at the corners 282, 284, 286 and 288. In such an example, guidance system 120 or 132 may first guide the user to location 282 so that the user can place the beacon at beacon location 282. The system 120 or 132 may then guide the user to the next closest beacon location (288) so that the user can place a beacon there. This can continue with system 120 guiding the user to sequential beacon locations 286 and 284, etc., until beacons are placed at all the beacon locations.

Once all of the beacons are placed at the beacon locations, then the beacon system (the beacons themselves) survey themselves to identify the configuration of mowing area 104. This is indicated by block 290 in the flow diagram of FIG. 4. In one example, the beacons communicate with one another to identify their precise locations. This is indicated by block 292. For instance, it may be that the user has placed the beacons approximately at beacons locations 282-288. However, in order to be more precise, the beacons communicate with one another to identify their precise locations, relative to one another. The beacons can also illustratively establish communication with the robotic mower 102 to identify its location, relative to the beacons. This is indicated by block 294. The system can survey itself to identify the configuration in other ways as well, and this is indicated by block 296. The navigation system 202 in mower then begins to control its position with the positioning system (e.g., the positioning system established by the set of deployed beacons) that is in place. This is indicated by block 298 in the flow diagram of FIG. 4. Navigation system 202 can generate position or navigation signals and provide them to control signal generator 204 so that the controllable subsystems 194 can navigate mower 102. Generating the position/navigation signals is indicated by block 300. Performing mower navigation using the position/navigation signals is indicated by block 302.

In one example, the navigation can be performed using a combined satellite/beacon system as indicated by block 304. Navigation can also be performed using dead reckoning system 212. The mower control with the positioning system (e.g., the beacon system) can be done in other ways as well, and this is indicated by block 306.

Figure 9:
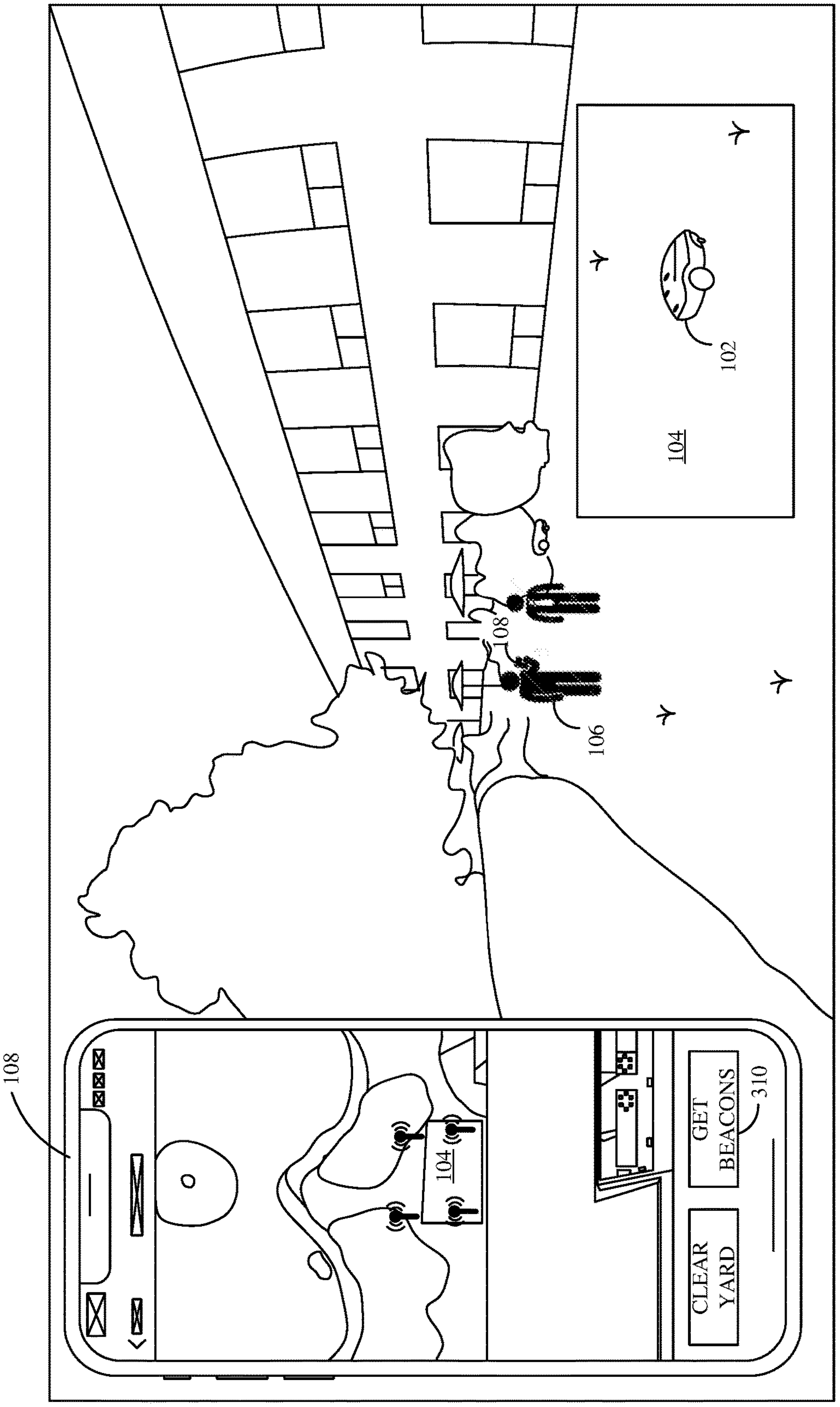

FIGS. 8-11 show examples of how a beacon placement guidance system (e.g., system 120 or 132) guides a user to placement of beacons at beacon locations. In one example, user device 108 is shown as a smartphone. It is displaying, in FIG. 8, a satellite image of an area that is to be mowed. FIG. 9 shows that the user 106 has traced or otherwise defined a boundary over area 104 and has actuated a "get beacons" actuator 310. This causes mowing area definition system 119 to identify the traced area 104 as the mowing area and user device 108 to transmit the marked-up image to position control configuration system 110 which identifies a beacon configuration (e.g., a number of beacons and beacon locations) so that mowing area 104 can be mowed. Once the beacon locations are obtained, they are shown roughly on the corners of area 104, in FIG. 9.

Figure 10:
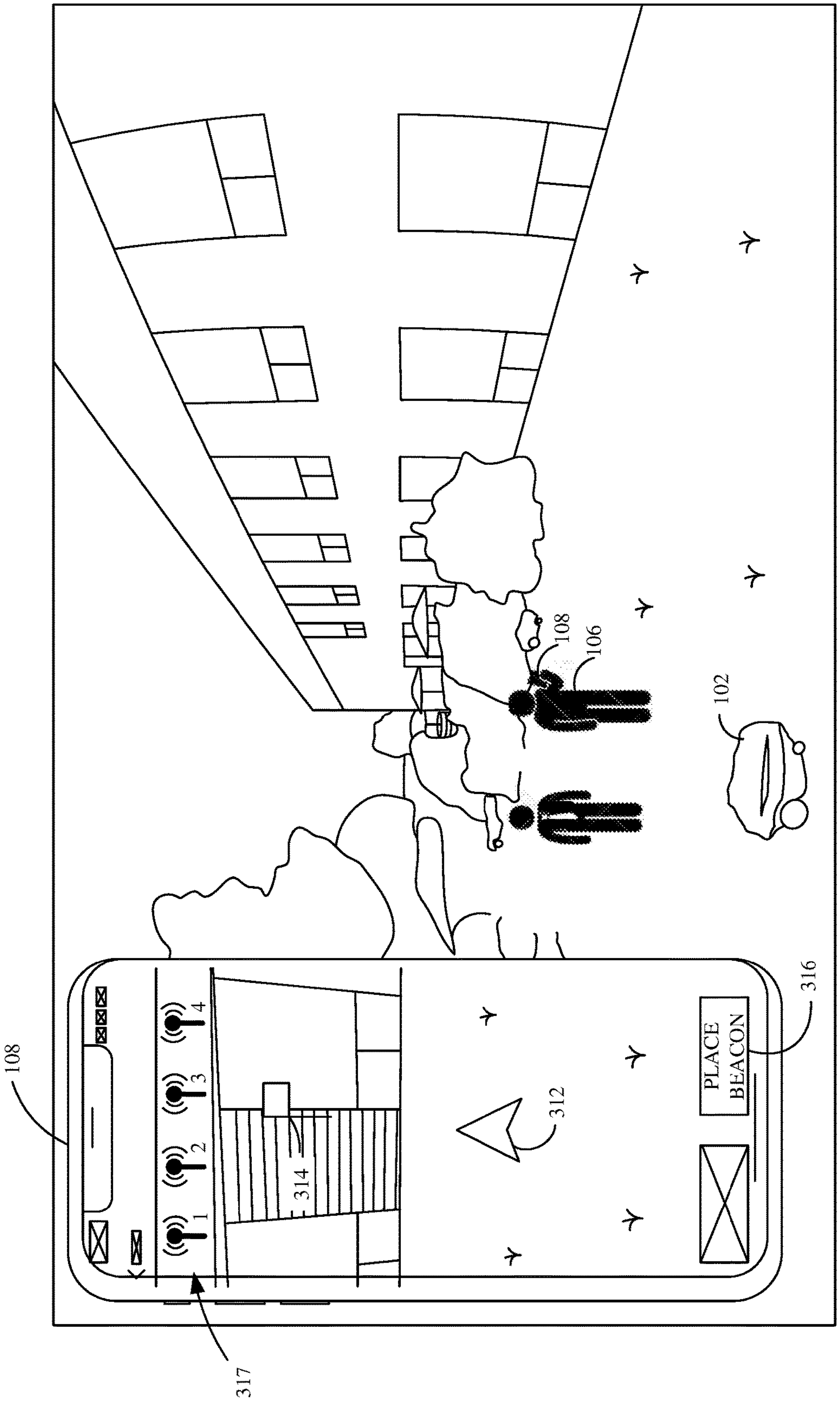
Figure 11:
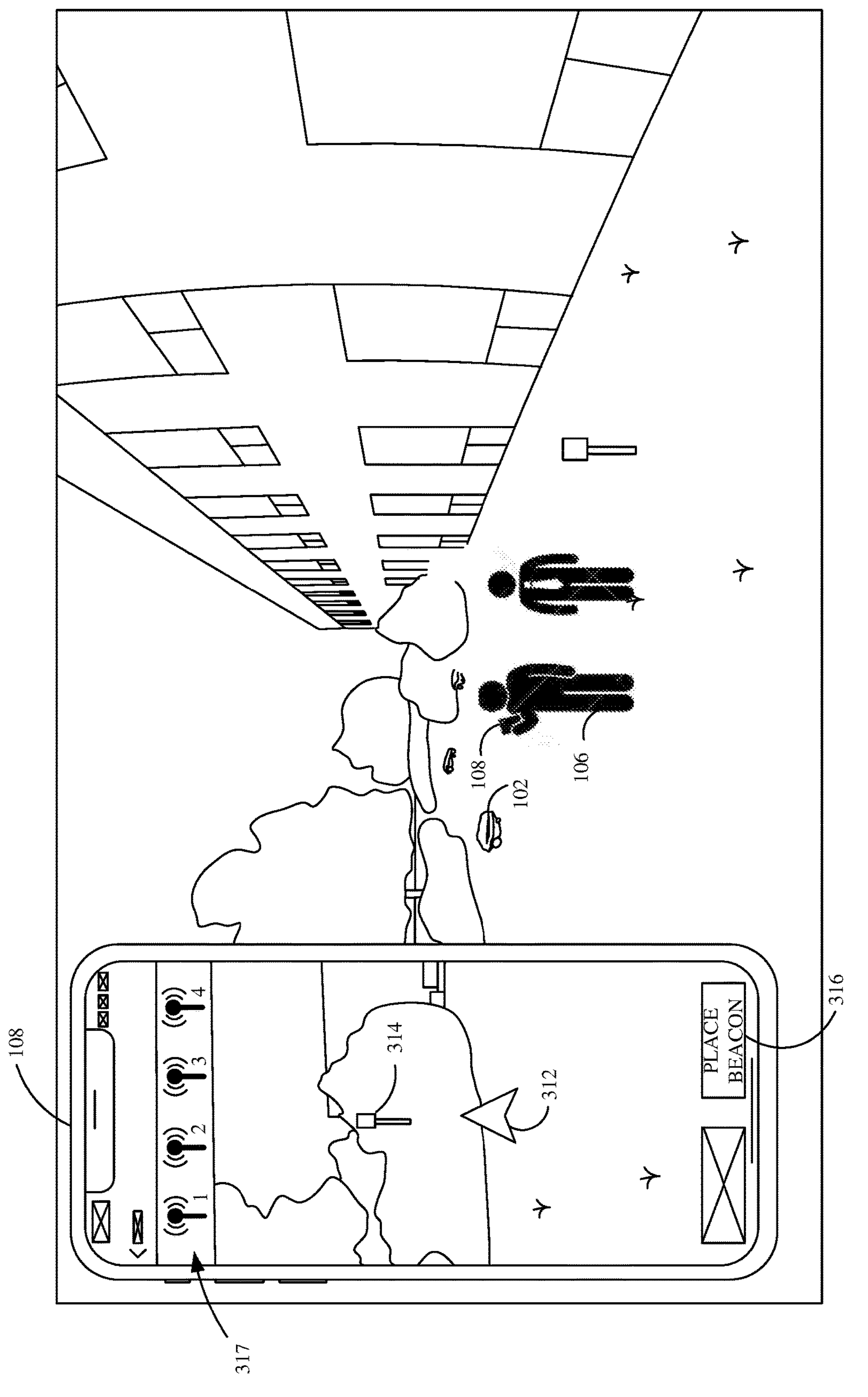

Beacon placement guidance system 120 or 132 then controls augmented reality system 116 to generate augmented reality display elements on the camera view of camera system 118 of user device 108 in order to guide the user to the beacon locations so the user can place beacons at those locations. FIG. 10, for instance, shows that the camera view of user device 108 is now displaying a superimposed augmented reality guidance arrow 312 which is guiding the user 106 toward a beacon location identified by a beacon location indicator 314. As the user walks in the direction of arrow 312, the beacon location indicator 314 moves downward on the screen to come into virtual contact with the ground (e.g., indicator 314 will appear, through the camera view, as if it is in contact with a point on the ground), so that the user knows where to place the beacon. Once the beacon is placed there, the user illustratively actuates the place beacon actuator 316 to indicate to guidance system 120 or 132 that the beacon has been placed. The display shown in FIG. 10 has beacon display elements 317 that show that four beacons are to be placed in the beacon configuration. As the user actuates the place beacon actuator 316, indicating that a beacon has been placed, then one of the beacon representations in beacon indicator 317 will illustratively change colors or intensities, or blink, or otherwise indicate that the beacon has been placed. FIG. 11 now shows that beacon 1 has been placed, and the user is moving toward beacon 2.

Guidance system 120 or 132 then controls augmented reality system 116 to superimpose the augmented reality guidance arrow on the camera view to guide the user 106 to the next beacon location. FIG. 11, for instance, shows that the guidance arrow 312 is now directing the user to another beacon location identified by beacon location indicator 314. Again, as the user comes closer to the beacon location identified by indicator 314, indicator 314 may move downward on the screen to come into virtual contact with the ground so that the user 106 can again place the beacon at the proper location on the ground.

FIG. 12 is a flow diagram illustrating one example of the operation of beacon configuration generator 134 (shown in FIG. 2) in more detail. Polygon parsing system 146 first receives the marked up geographical representation and identifies the polygons that are identified in the area traced out by user 106 to define the mowing area 104 as a set of polygons. Obtaining this information is indicated by block 320 in the flow diagram of FIG. 12.

As discussed above, in one example, optimization system 150 may identify not only the beacon locations in the configuration, but also the number of beacons. If only the beacon locations are to be optimized, and the number of beacons is a given (such as the number owned by a user 106, or otherwise pre-determined), then beacon number selector 156 detects the given or predetermined number of beacons, so that it knows the number of beacons for which locations are to be optimized. The number of beacons can be stored in data store 128, input by the user, etc. Detecting the given number of beacons is indicated by block 324.

Optimization system 150 them optimizes an objective function over a plurality of different sets of beacon locations. This is indicated by block 326 in the flow diagram of FIG. 12. This can be done using any of a wide variety of different optimization systems, such as a Monte Carlo optimization system and/or a gradient descent optimization system, etc., as indicated by block 328. In addition, the system can discretize beacon locations in order to enhance the speed at which the beacon locations are determined. This is indicated by block 330. In one example, the total system positioning error for a beacon configuration (as is described in greater detail below) is the objective function which is minimized across the mowing area. This is indicated by block 332. The objective function can be optimized over a plurality of different sets of beacon locations in other ways as well, and this is indicated by block 334.

If, at block 322, it is determined that both the number of beacons and the beacon locations are to be optimized, then optimization system 150 obtains an indication of an acceptable system positioning accuracy. This is indicated by block 336. It then optimizes an objective function over a plurality of sets of beacon locations and over a range of numbers of beacons. This is indicated by block 338 in the flow diagram of FIG. 12. Again, the optimization can be a gradient descent optimization system or another system.

Beacon configuration generator 134 then outputs the optimization results. This is indicated by block 340. The optimization results may be a particular number of beacons and/or set of beacon locations. This is indicated by blocks 342 and 344. The optimization results can include a wide variety of other items 346 as well.

FIG. 13 is a flow diagram illustrating one example of the operation of optimization system 150 in more detail. Beacon location selector 158 first selects a set of beacon locations to run an optimization algorithm on. This is indicated by block 348 in the flow diagram of FIG. 13. In an example in which the number of beacons is also be optimized, then beacon number selector 156 selects a number of beacons for optimization and thus the number of beacons and the beacon locations are optimized. This is indicated by block 350. The beacon locations and number of beacons can be identified in other ways as well, and this is indicated by block 352.

Position determination performance system 160 then identifies the ability to determine position, at each spot in the mowing area 104 defined by the polygons input by the user. This is indicated by block 354. For instance, given this number of beacons, at the selected beacon locations, the ability of the system to accurately guide the mower 102 (e.g., the ability of the mower 102 to determine its position) at each spot in the mowing area is identified. In one example, this can be estimated as an error ellipse 356. System 160 can do this by considering beacon visibility on the terrain, ranging accuracy, the geometry of the range measurements being used by the system, etc. This is indicated by block 358. Error estimator 162 estimates the position error identified by error estimator 162 at each point in the mowing area given these considerations.

Nearby position error logic 164 can also average the nearby geometric position errors to obtain an actual positioning error at each given spot in the mowing area. This is indicated by block 360. The ability to determine position at each spot in the mowing area can be done in a wide variety of other ways as well, and this is indicated by block 362.

System position error identifier 168 then identifies the total system positioning error for this set of beacons and locations. This is indicated by block 364. For instance, the total system position error can be identified for this combination of beacon locations and number of beacons, where the number of beacons is optimized as well. This is indicated by block 366. In one example, the total system positioning error is identified as the worst case error across the entire mowing area 104. This is indicated by block 368. The total system positioning error can be identified in other ways as well, and this is indicated by block 370.

Optimization criteria evaluation system 170 then determines whether the optimization stopping criteria are met. This is indicated by block 372. For instance, where the total system positioning error is the objective function that is minimized, then optimization criteria evaluation system 170 can determine whether the total system error is at a minimum or is close enough to a minimum (either a local minimum or an absolute minimum, etc.) or otherwise satisfies the optimization stopping criteria. If not, processing reverts to block 348 where another set of beacon locations is selected for testing, and where another number of beacons can also be selected.

However, at some point, the optimization stopping criteria will be met at block 372. When that happens, output generator 172 generates an output indicative of the set of beacon locations identified as optimum. This is indicated by block 374. In addition, where the number of beacons is to be optimized, then output generator 172 can output the optimum combination of beacon locations and number of beacons. This is indicated by block 376. The output can be generated in a wide variety of other ways as well, and this is indicated by block 378.

FIG. 14 is a flow diagram illustrating one example of the operation of connectivity detection system 152 in determining the level of connectivity that mower 102 will encounter with different positioning systems. For example, the level of connectivity to a satellite-based positioning system across mowing area 104 can be determined and an action signal can be generated based on the connectivity.

It is first assumed, as with the previous discussion, that connectivity detection system 152 receives the boundary of the mowing area as delineated by the user on an image or map or other geographical representation of the worksite. This is indicated by block 380 in the flow diagram of FIG. 14. Satellite availability estimator 176 then generates an estimate of satellite-based positioning signal availability across the mowing area. This is indicated by block 382. This can be done, for instance, by considering satellite location 384, satellite signal strength 386, the number of visible satellites 388, that are visible to the mowing area, among a wide variety of other things 390. Without sufficient satellite availability, the satellite-based positioning accuracy will be relatively poor.

Based upon the satellite availability estimated at each point (or the estimated satellite-based positioning accuracy) in the mowing area by estimator 176, beacon area identifier 182 can identify certain areas, within the mowing area, where position signals from UWB beacons would favorably augment the satellite position information. For instance, it may be that some areas in the mowing area have obstructions (such as trees, buildings, other structures, etc.) that block those areas from receiving satellite-based position information. Identifying areas, within the mowing area, where beacons are to be used based on insufficient satellite availability is indicated by block 392 in the flow diagram of FIG. 14.

FIG. 15 shows one example of this. FIG. 15 is similar to FIG. 5 above, and similar items are similarly numbered. However, in the example shown in FIG. 15, it is assumed that the user 106 has delineated the entire area 232 as the mowing area. Therefore, the user may have traced, on the satellite image or map, the boundary 232 to indicate that the entire area 232 is to be mowed. In that case, satellite availability estimator 176 then estimates the availability of satellite position signals across the entire area 232. This can be done by analyzing the satellite image.

On the satellite image, it can be seen, for instance, that trees 234-242 shade or obstruct some of the area 232, so that the satellite position information may not be available under the canopy of those trees. Satellite availability estimator 176 can thus estimate that the satellite availability in portions of area 232 will be relatively low. Thus, beacon area identifier 182 identifies a plurality of different areas 394, 396, 398 and 400 as areas where the estimated availability of satellite position information will be relatively low. This can be determined by determining that the estimated satellite availability is below a threshold availability amount, or in other ways.

It will also be noted that, at this point, mower type recommendation system 178 can generate a recommendation as to the type of mower that should be used to mow the mowing area 232. If the mowing area 232 had good satellite position signal availability across the entire area, then mower type recommendation system 178 could provide an output recommending that the mower that should be used in area 232 only needs to have satellite receiver capabilities for navigation. However, if the satellite availability is relatively poor across the entire area, then mower type recommendation system 178 may generate an output indicating that the mower needs to only have UWB-beacon positioning capabilities. However, in an example such as that shown in FIG. 15, where satellite availability is generally good across the entire area except for some small areas within the mowing area, then it may be that mower type recommendation system 178 may recommend a mower that has both UWB beacon capabilities and satellite capabilities. These are examples only, and outputting an indication of a recommended mower positioning system is indicated by block 402 in the flow diagram of FIG. 14. The areas where beacons are to be used in the mowing area, based upon satellite availability, can be identified in other ways as well. This is indicated by block 404.

Optimization system interaction logic 180 then interacts with optimization system 150 to obtain an optimum beacon number and optimum beacon locations for the areas identified by beacon area identifier 182. Identifying the beacon layout (e.g., number and location of beacons) is indicated by block 406 in the flow diagram of FIG. 14. Output generator 172 can then generate an output indicative of the identified beacon layout, for the areas 394-400, within area 232, where the beacons are to be deployed. This is indicated by block 408. By way of example, beacon placement guidance system 132 or 120 can guide the user 106 to the beacon locations where the user can deploy the beacons, and provide an input indicating that the beacons have been placed in the proper positions, given the beacon layout for the various regions 394-400.

FIG. 16 shows one example of this. FIG. 16 is similar to FIG. 15, and similar items are similarly numbered. However, FIG. 16 now shows that the beacon locations are identified for the various regions 394-400. For example, the beacon locations corresponding to area 394 are identified as areas 410, 412, 414, and 416. The beacon locations for area 396 are identified as beacon locations 418, 420, 422 and 424. The beacon locations for area 397 include beacons 422 and 424 from area 396, and also include two additional beacon locations 426 and 428. Similarly, the beacon locations for both areas 398 and 400 are combined so that only four beacon locations 430, 432, 434 and 436 have been identified by optimization system 150. Thus, only four UWB beacons need to be placed to cover positioning in both areas 398 and 400. Again, once the user places the beacons, the user illustratively actuates a user input indicating that the beacons have been placed.

Detecting that the beacons have been placed according to the layout provided is indicated by block 438 in the flow diagram of FIG. 14. The beacons can then communicate with one another and with mower 102 so that mower 102 can perform navigation and control based on the mixed satellite/beacon signals received in mowing area 232. When mower 102 is in an area where satellite positioning is available, it can use satellite positioning. When it is in an area where beacon-based positioning is to be used, it can use beacon positioning. Controlling the mower in this way is indicated by block 440 in the flow diagram of FIG. 14.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 17 is a block diagram of architecture 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 17, some items are similar to those shown in FIG. 1 and they are similarly numbered. FIG. 17 specifically shows that position control configuration system 110 and map/image generation system 112 can be located at a remote server location 502. Therefore, mower 102 and user device 108 access those systems through remote server location 502.

FIG. 17 also depicts another example of a remote server architecture. FIG. 17 shows that it is also contemplated that some elements of FIG. 1 are disposed at remote server location while others are not. By way of example, data store 128 or other items can be disposed at a location separate from location 502, and accessed through the remote server at location 502. Regardless of where they are located, they can be accessed directly by system 110, through a network (either a wide area network or a local area network), they can be hosted at a remote site by a service, or they can be provided as a service, or accessed by a connection service that resides in a remote location. All of these architectures are contemplated herein.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

FIG. 18 is a simplified block diagram of one illustrative example of a handheld or mobile computing device that can be used as a user's or client's hand held device 16, in which the present system (or parts of it) can be deployed. For instance, a mobile device can be used as user device 108. FIGS. 19-20 are examples of handheld or mobile devices.

FIG. 18 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 19 shows one example in which device 16 is a tablet computer 600. In FIG. 19, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 20 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 21 is one example of a computing environment in which elements of FIG. 1, or parts of it, (for example) can be deployed. With reference to FIG. 21, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 21.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 21 illustrates operating system 834, application programs 835, other program modules 836, and program data 837.

The computer 810 may also include other removable/non-removable volatile/nonvolatile computer storage media. By way of example only, FIG. 21 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 810. In FIG. 21, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 21 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a computer implemented method, comprising:

receiving a geographical representation of a worksite with a defined mowing area indicated thereon;

identifying a positioning error, across the mowing area, that will be incurred by a robotic mower using each of a plurality of different ultra-wide band (UWB) beacon configurations;

outputting one of the plurality of different UWB beacon configurations, based on the positioning error, as an acceptable UWB beacon configuration, for positioning the robotic mower in the mowing area; and generating an action signal based on the acceptable UWB beacon configuration.

Example 2 is the computer implemented method of any or all previous examples wherein generating an action signal comprises:

communicating the selected UWB beacon configuration to a mobile device for user deployment of a set of UWB beacons according to the selected UWB beacon configuration.

Example 3 is the computer implemented method of any or all previous examples wherein identifying a positioning error for a given UWB beacon configuration comprises:

identifying an ability to determine position, at each of a plurality of different spots in the mowing area, for the given UWB beacon configuration; and identifying a total system positioning error for the given UWB beacon configuration based on the ability to determine position at each of the plurality of different spots in the mowing area.

Example 4 is the computer implemented method of any or all previous examples and further comprising:

identifying the acceptable UWB configuration based on the positioning error.

Example 5 is the computer implemented method of any or all previous examples wherein identifying the acceptable UWB configuration based on the positioning error comprises:

selecting a UWB beacon configuration;

identifying an ability to determine position at each of a plurality of different spots in the mowing area, for the selected UWB beacon configuration; and identifying a total system positioning error for the selected UWB beacon configuration based on the ability to determine position at each of a plurality of different spots in the mowing area.

Example 6 is the computer implemented method of any or all previous examples wherein identifying the acceptable UWB beacon configuration comprises:

repeating, until a set of optimization criteria are met, for each of the plurality of different UWB beacon configurations, the steps of:

identifying an ability to determine position at each of a plurality of different spots in the mowing area; and identifying a total system positioning error based on the ability to determine position at each of a plurality of different spots in the mowing area.

Example 7 is the computer implemented method of any or all previous examples wherein identifying the acceptable UWB beacon configuration comprises:

selecting the acceptable UWB beacon configuration based on the optimization criteria being met, by evaluating an objective function, based on the total system positioning error, for each of the plurality of different UWB beacon configurations.

Example 8 is the computer implemented method of any or all previous examples wherein receiving the geographical representation comprises one of:

receiving a satellite image, with the user-defined mowing area defined thereon.

Example 9 is the computer implemented method of any or all previous examples and further comprising:

identifying positioning system information availability at points across the mowing area for a UWB beacon-based positioning system and for a satellite-based positioning system;

determining which of the UWB beacon-based positioning system and the satellite-based positioning system has better availability at the points across the mowing system; and generating an action signal based on the determination Example 10 is the of the plurality of UWB configurations comprises:

identifying estimated satellite-based positioning information availability across the mowing area, based on the satellite image; and identifying the acceptable UWB beacon configuration based on the estimated satellite-based positioning information availability.

Example 11 is the computer implemented method of any or all previous examples and further comprising:

based on the estimated satellite-based positioning system availability, identifying a UWB location for placement of a UWB configuration.

Example 12 is a computer implemented method of controlling a mobile device, comprising:

receiving a geographical representation of a worksite;

displaying the geographical representation of the worksite, on a display mechanism of the mobile device, for user interaction;

detecting user interaction with the geographical representation of the worksite to define a mowing area;

obtaining an ultra-wide band (UWB) beacon configuration corresponding to the mowing area; and controlling the display mechanism to provide a user guidance display element on the display mechanism directing a user to beacon locations in the UWB beacon configuration.

Example 13 is the computer implemented method of any or all previous examples wherein controlling the display mechanism comprises:

generating the user guidance display element on a camera view of a camera system on the mobile device using an augmented reality system.

Example 14 is the computer implemented method of any or all previous examples and further comprising:

controlling the display mechanism to display a beacon deployment actuator that is actuatable to indicate deployment of a UWB beacon; and detecting user actuation of the beacon deployment actuator indicating deployment of a first UWB beacon.

Example 15 is the computer implemented method of any or all previous examples and further comprising:

based on detecting user actuation of the beacon deployment actuator, providing the user guidance display element directing the user to a next beacon location in the UWB beacon configuration; and detecting user actuation of a beacon deployment actuator indicating deployment of a UWB beacon at the next beacon location in the UWB beacon configuration.

Example 16 is the computer implemented method of any or all previous examples and further comprising:

repeating the steps of providing the user guidance display element directing the user to a next beacon location in the UWB beacon configuration and detecting user actuation of a beacon deployment actuator indicating deployment of a UWB beacon at the next beacon location in the UWB beacon configuration until UWB beacons are deployed at each beacon location in the UWB beacon configuration.

Example 17 is the computer implemented method of any or all previous examples wherein providing the user guidance display element directing the user to a next beacon location in the UWB beacon configuration comprises:

identifying a closest remaining beacon location in the UWB beacon configuration, that is closest to the mobile device, at which a UWB beacon has yet to be deployed; and generating the user guidance display element based on the next closest beacon location.

Example 18 is a computing system, comprising:

a beacon configuration generator receiving a geographical representation of a worksite with a defined mowing area indicated thereon and identifying the mowing area on the geographical representation;

a position determination performance system identifying a positioning error, across the mowing area, that will be incurred by a robotic mower using each of a plurality of different ultra-wide band (UWB) beacon configurations;

an output generator outputting one of the plurality of different UWB beacon configurations, based on the positioning error, as an acceptable UWB beacon configuration, for positioning the robotic mower in the mowing area; and a communication system generating an action signal based on the acceptable UWB beacon configuration.

Example 19 is the computing system of any or all previous examples wherein the position determination performance system comprises:

an error estimator identifying an ability to determine position, at each of a plurality of different spots in the mowing area, for a given UWB beacon configuration; and a system position error identifier identifying a total system positioning error for the given UWB beacon configuration based on the ability to determine position at each of the plurality of different spots in the mowing area.

Example 20 is the computing system of any or all previous examples and further comprising:

a satellite availability estimator that identifies positioning system information availability at points across the mowing area for a satellite-based positioning system;

a beacon area identifier configured to identify beacon areas, within the mowing area, where the availability of the positioning system information from the satellite-based positioning system is below a threshold availability; and system interaction logic that interacts with the position determination performance system and the output generator to output one of a plurality of different UWB beacon configurations, corresponding to each identified beacon area, as an acceptable UWB beacon configuration, for positioning the robotic mower in the corresponding beacon area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:

receiving an image of a worksite;

displaying the image of the worksite on a user interface mechanism;

receiving a user touch interaction, with the displayed image of the worksite, that traces at least a portion of a perimeter of a mowing area;

based on the user touch interaction with the displayed image of the worksite, identifying a user-defined boundary that defines the perimeter of the mowing area of the worksite;

generating, in response to the user touch interaction, a display element on the displayed image of the worksite, the display element indicative of the user-defined boundary of the mowing area on the displayed image of the worksite;

based on the user-defined boundary, identifying a positioning error associated with each respective potential ultra-wide band (UWB) beacon configuration, of a plurality of different potential ultra-wide band (UWB) beacon configurations, the positioning error corresponding to operation of a robotic mower across the mowing area with the respective potential UWB beacon configuration;

based on the positioning error, identifying a particular UWB beacon configuration, of the plurality of different potential UWB beacon configurations, as an acceptable UWB beacon configuration to be deployed for positioning the robotic mower in the mowing area; and generating an action signal based on the acceptable UWB beacon configuration.

2. The computer implemented method of claim 1, wherein generating an action signal comprises:

generating the action signal to communicate the acceptable UWB beacon configuration to a mobile device for user deployment of a set of UWB beacons according to the acceptable UWB beacon configuration.

3. The computer implemented method of claim 1 and further comprising:

identifying a position accuracy threshold indicative of a maximum acceptable positioning error; and identifying the particular UWB beacon configuration, as the acceptable UWB beacon configuration, that satisfies the position accuracy threshold with a lowest number of beacons based on the position accuracy threshold and the positioning error corresponding to each different potential UWB beacon configuration of the plurality of different potential UWB beacon configurations.

4. The computer implemented method of claim 3, wherein identifying the positioning error, across the mowing area, that will be incurred by the robotic mower using each different potential UWB beacon configuration of the plurality of different potential UWB beacon configurations comprises:

repeating for each different potential UWB beacon configuration of the plurality of different potential UWB beacon configurations, the steps of:

identifying an ability to determine a position at each of a plurality of different spots in the mowing area; and identifying a total system positioning error based on the corresponding identified ability to determine the position at each of the plurality of different spots in the mowing area.

5. The computer implemented method of claim 3, wherein identifying the positioning error, across the mowing area, that will be incurred by the robotic mower using each different potential UWB beacon configuration of the plurality of different potential UWB beacon configurations comprises:

repeating, until a set of optimization criteria are met, for each different potential UWB beacon configuration of the plurality of different potential UWB beacon configurations, the steps of:

identifying an ability to determine a position at each of a plurality of different spots in the mowing area; and identifying a total system positioning error based on the corresponding identified ability to determine the position at each of the plurality of different spots in the mowing area.

6. The computer implemented method of claim 1 and further comprising:

identifying positioning system information availability at points across the mowing area for a UWB beacon-based positioning system and for a satellite-based positioning system;

determining which of the UWB beacon-based positioning system and the satellite-based positioning system has better availability at the points across the mowing area; and controlling the robotic mower at a point in the mowing area using whichever one of the UWB beacon-based position system or the satellite-based position system has the better availability at the point in the mowing area, based on the determination.

7. The computer implemented method of claim 1, wherein identifying the particular UWB beacon configuration, of the plurality of different potential UWB beacon configurations, as the acceptable UWB beacon configuration comprises:

identifying estimated satellite-based positioning information availability across the mowing area, based on a satellite image of the worksite; and identifying the acceptable UWB beacon configuration based on the estimated satellite-based positioning information availability;

and further comprising:

based on the estimated satellite-based positioning information availability, identifying a UWB location for placement of a UWB configuration.

8. The computer implemented method of claim 1 wherein identifying the positioning error comprises:

identifying the positioning error, across the mowing area, that will be incurred by the robotic mower using each different potential UWB beacon configuration of the plurality of different potential UWB beacon configurations; and identifying, as the acceptable UWB configuration, a UWB beacon configuration, of the plurality of different potential UWB beacon configurations, that has a lowest position error, based on the positioning error corresponding to each different potential UWB beacon configuration of the plurality of different potential UWB beacon configurations.

9. A computer implemented method of controlling a handheld mobile device, the computer implemented method comprising:

receiving an image of a worksite;

displaying the image of the worksite, on a touch sensitive display mechanism of the handheld mobile device, for user interaction;

receiving a user touch input with the touch sensitive display mechanism of the handheld mobile device displaying the image of the worksite, wherein the user touch input traces at least a portion of a perimeter of a mowing area;

generating a user-defined boundary defining the perimeter of the mowing area of the worksite based on the user touch input;

overlaying a boundary display element on the displayed image, the boundary display element representing the user-defined boundary of the mowing area in the displayed image;

based on the user-defined boundary, identifying a positioning error associated with each respective potential ultra-wide band (UWB) beacon configuration, of a plurality of different potential ultra-wide band (UWB) beacon configurations, the positioning error corresponding to operation of a robotic mower across the mowing area with the respective potential UWB beacon configuration;

based on the positioning error, obtaining an acceptable ultra-wide band (UWB) beacon configuration from the plurality of different potential UWB beacon configurations; and generating an action signal based on the acceptable UWB beacon configuration.

10. The computer implemented method of claim 9 and further comprising:

controlling the touch sensitive display mechanism to display a beacon deployment actuator that is actuatable to indicate deployment of a first UWB beacon at a first UWB beacon location; and detecting user actuation of the beacon deployment actuator indicating deployment of the first UWB beacon at the first UWB beacon location.

11. The computer implemented method of claim 10 and further comprising:

based on detecting user actuation of the beacon deployment actuator, providing a user guidance display element directing a user to a second UWB beacon location in the UWB beacon configuration at the user-defined boundary of the mowing area; and detecting user actuation of the beacon deployment actuator indicating deployment of a second UWB beacon at the second UWB beacon location in the UWB beacon configuration.

12. The computer implemented method of claim 11, wherein providing the user guidance display element directing the user to the second UWB beacon location in the UWB beacon configuration comprises:

identifying, as the second UWB beacon location, a closest remaining beacon location in the UWB beacon configuration, that is closest to the handheld mobile device, at which a UWB beacon has yet to be deployed; and generating the user guidance display element based on the identification of the second UWB beacon location.

13. The computer implemented method of claim 9, wherein the handheld mobile device comprises a camera system and an augmented reality system, and generating the action signal comprises controlling the touch sensitive display mechanism to provide a user guidance display element on a camera view of the camera system on the handheld mobile device using the augmented reality system of the handheld mobile device, the user guidance display element directing a user to a first UWB beacon location in the acceptable UWB beacon configuration at the user-defined boundary of the mowing area.

14. The computer implemented method of claim 13, wherein controlling the touch sensitive display mechanism comprises one or more of:

generating an augmented reality beacon location indicator display element on the camera view of the camera system on the handheld mobile device that indicates the first UWB beacon location in the UWB beacon configuration at the user-defined boundary of the mowing area; and generating an augmented reality guidance arrow that indicates a direction to travel to get to the first UWB beacon location relative to a current position of the handheld mobile device.

15. The computer implemented method of claim 14, wherein controlling the touch sensitive display mechanism comprises:

controlling the touch sensitive display mechanism to adjust a height of the augmented reality beacon location indicator display element relative to a ground on the camera view of the camera system on the handheld mobile device as the handheld mobile device travels in the direction indicated by the augmented reality guidance arrow.

16. A computing system comprising:

at least one processor; and memory storing instructions executable by the at least one processor, wherein the instructions, when executed, cause the computing system to:

receive an image of a worksite;

display the image of the worksite on a touch sensitive display mechanism;

receive a user touch input with the touch sensitive display mechanism displaying the image of the worksite, wherein the user touch input traces at least a portion of a perimeter of a mowing area;

generate a user-defined boundary defining the perimeter of the mowing area of the worksite based on the user touch input;

overlay a boundary display element on the displayed image, the boundary display element representing the user-defined boundary of the mowing area in the displayed image;

based on the user-defined boundary, identify a positioning error associated with each respective potential ultra-wide band (UWB) beacon configuration, of a plurality of different potential ultra-wide band (UWB) beacon configurations, the positioning error corresponding to operation of a robotic mower across the mowing area with the respective potential UWB beacon configuration;

based on the positioning error, obtain an acceptable ultra-wide band (UWB) beacon configuration from the plurality of different potential UWB beacon configurations; and generate an action signal based on the acceptable UWB beacon configuration.

* * * * *